United States Patent
Guo et al.

(10) Patent No.: US 11,445,450 B2
(45) Date of Patent: Sep. 13, 2022

(54) UPLINK DATA TRANSMISSION METHOD, TERMINAL DEVICE, AND BASE STATION

(71) Applicant: HUAWEI TECHNOLOGIES CO., LTD., Guangdong (CN)

(72) Inventors: Yinghao Guo, Shanghai (CN); Wenjie Peng, Shanghai (CN); Yang Zhao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/874,085

(22) Filed: May 14, 2020

(65) Prior Publication Data

US 2020/0275391 A1  Aug. 27, 2020

Related U.S. Application Data

(63) Continuation of application No. PCT/CN2018/115925, filed on Nov. 16, 2018.

(30) Foreign Application Priority Data

Nov. 16, 2017  (CN) .......................... 201711140388.5

(51) Int. Cl.
*H04W 52/36* (2009.01)
*H04L 41/0806* (2022.01)
(Continued)

(52) U.S. Cl.
CPC ....... *H04W 52/365* (2013.01); *H04L 41/0806* (2013.01); *H04W 52/146* (2013.01);
(Continued)

(58) Field of Classification Search
CPC ............. H04W 52/365; H04W 52/146; H04W 72/0453; H04W 72/14; H04W 88/06;
(Continued)

(56) References Cited

U.S. PATENT DOCUMENTS

2010/0158147 A1* 6/2010 Zhang ................. H04W 52/146
375/260
2010/0238863 A1* 9/2010 Guo ...................... H04L 5/0046
370/328
(Continued)

FOREIGN PATENT DOCUMENTS

CN 101848487 A 9/2010
CN 102098682 A 6/2011
(Continued)

OTHER PUBLICATIONS

3GPP TSG RAN WG2 Meeting #99bis,R2-1711613:"PHR for wider bandwidth operation",LG Electronics Inc.Prague, Czech Republic, Oct. 9-13, 2017,total 4 pages.
(Continued)

*Primary Examiner* — Jamal Javaid
*Assistant Examiner* — Shawn D Miller
(74) *Attorney, Agent, or Firm* — Womble Bond Dickinson (US) LLP

(57) ABSTRACT

A transmission method includes: a terminal device receives an uplink grant from a base station; and the terminal device sends a report to the base station, where the report includes a power headroom of each of at least one uplink subcarrier, and/or a power headroom of each of at least one bandwidth part. According to the uplink data transmission method, the terminal device, and the base station in embodiments of this disclosure, a power headroom can be reported at a finer granularity.

20 Claims, 13 Drawing Sheets

(51) Int. Cl.
*H04W 52/14* (2009.01)
*H04W 72/04* (2009.01)
*H04W 72/14* (2009.01)
*H04W 88/06* (2009.01)

(52) U.S. Cl.
CPC ....... *H04W 72/0453* (2013.01); *H04W 72/14* (2013.01); *H04W 88/06* (2013.01)

(58) Field of Classification Search
CPC .............. H04W 52/265; H04W 52/367; H04L 41/0806
See application file for complete search history.

(56) References Cited

U.S. PATENT DOCUMENTS

| | | | |
|---|---|---|---|
| 2012/0044882 A1 | 2/2012 | Kim et al. | |
| 2015/0087296 A1* | 3/2015 | Kim ................... | H04W 52/365 455/422.1 |
| 2016/0309423 A1 | 10/2016 | Lee et al. | |
| 2016/0309426 A1 | 10/2016 | Zhang et al. | |
| 2017/0019866 A1* | 1/2017 | Malkamäki .......... | H04W 52/34 |
| 2019/0053170 A1* | 2/2019 | Lee ..................... | H04B 7/0617 |

FOREIGN PATENT DOCUMENTS

| | | | | |
|---|---|---|---|---|
| CN | 102149206 A | 8/2011 | | |
| CN | 103313372 A | 9/2013 | | |
| CN | 106961698 A | 7/2017 | | |
| EP | 2234316 A2 | 9/2010 | | |
| JP | 6456981 B2 * | 1/2019 | .......... | H04L 43/065 |
| WO | 2017183926 A1 | 10/2017 | | |

OTHER PUBLICATIONS

3GPP TS 36.101 V15.0.0 (Sep. 2017);3rd Generation Partnership Project;Technical Specification Group Radio Access Network,Evolved Universal Terrestrial Radio Access (E-UTRA);User Equipment (UE) radio transmission and reception (Release 15);total 1548 pages.
LG Electronics, Discussion on uplink power headroom report for NR. 3GPP TSG RAN WG1 NR Ad-Hoc#2, R1-1710357, 4 pages.
3GPP TS 36.213 V14.4 0 (Sep. 2017);3rd Generation Partnership Project;Technical Specification Group Radio Access Network,Evolved Universal Terrestrial Radio Access (E-UTRA);Physical layer procedures(Release 14);total 461 pages.
3GPP TS 36.321 V14.4.0 (Sep. 2017);3rd Generation Partnership Project;Technical Specification Group Radio Access Network,Evolved Universal Terrestrial Radio Access (E-UTRA);Medium Access Control (MAC) protocol specification (Release 14);total 108 pages.

* cited by examiner

UPLINK DATA TRANSMISSION METHOD, TERMINAL DEVICE, AND BASE STATION

CROSS-REFERENCE TO RELATED APPLICATIONS

This application is a continuation of International Application No. PCT/CN2018/115925, filed on Nov. 16, 2018, which claims priority to Chinese Patent Application No. 201711140388.5, filed on Nov. 16, 2017. The disclosures of the aforementioned applications are hereby incorporated by reference in their entireties.

TECHNICAL FIELD

This disclosure relates to the communications field, and more specifically, to an uplink data transmission method, a terminal device, and a base station.

BACKGROUND

In a long term evolution (LTE) system, a terminal device sends a power headroom report (PHR) to an evolved NodeB (e.g., evolutional node B, eNB, etc.). The PHR is a set of media access control (MAC) control elements (CE) including a power headroom (PH). The PHR may provide the eNB with information for power control and scheduling. The PHR is reported in a scheduling unit. The eNB may select an appropriate modulation and coding scheme (MCS) and resource size for uplink transmission of the terminal device based on the PHR.

In LTE, PH reporting is on a per cell basis, and uplink scheduling performed by a base station for the terminal device is also on a per cell basis. However, a manner of reporting the PH on a per cell basis already cannot meet requirements of a fifth generation (e.g., 5th generation, 5G, etc.) new radio (NR) system. Therefore, a new solution is urgently required.

SUMMARY

This disclosure provides an uplink data transmission method, a terminal device, and a base station, so that a power headroom can be reported at a finer granularity. This helps improve accuracy of scheduling by the base station.

According to a first aspect, an uplink data transmission method is provided, including:

receiving, by a terminal device, an uplink grant from a base station; and sending, by the terminal device, a report to the base station, where the report includes a power headroom of each of at least one uplink subcarrier, and/or a power headroom of each of at least one bandwidth part.

In this embodiment of this disclosure, the terminal device sends the report to the base station, where the report includes the power headroom of each of the at least one uplink subcarrier, and/or the power headroom of each of the at least one bandwidth part. Therefore, the power headroom is reported at a finer granularity, and this helps improve accuracy of scheduling by the base station.

Optionally, each uplink subcarrier may be an active or inactive uplink subcarrier, for example, a UL carrier, a SUL carrier, or a non-SUL carrier.

Optionally, the at least one bandwidth part may be bandwidth parts of a same uplink subcarrier or different uplink subcarriers. This is not limited in this embodiment of this disclosure.

In one embodiment, the report includes a report on a first media access control MAC entity, and the method further includes:

in a serving cell in which the first MAC entity is located, activating, configuring, or reconfiguring at least one of the following that correspond to the first MAC entity: an uplink subcarrier, a bandwidth part, and an uplink shared channel; and triggering, by the terminal device, the report on the first MAC entity.

Therefore, in this embodiment of this disclosure, a new PHR trigger condition is provided for a serving cell in which at least one uplink subcarrier or at least one bandwidth part is configured. When at least one of the uplink subcarrier, the bandwidth part, and the uplink shared channel is activated or reconfigured, the terminal device can report a PHR in a timely manner, so that scheduling can be performed by the base station for the terminal device.

In one embodiment, a serving cell includes a plurality of MAC entities and is a serving cell in a process in which the terminal device performs multi-connectivity communication, and the method further includes:

activating, configuring, or reconfiguring at least one of the following that correspond to a first MAC entity in the plurality of MAC entities: an uplink subcarrier, a bandwidth part, and an uplink shared channel; and triggering, by the terminal device, a report on each of the plurality of MAC entities, or triggering a report only on a first MAC entity.

Therefore, the new trigger condition provided in this embodiment of this disclosure can be applicable to a multi-connectivity communications system.

In some possible implementations, the sending, by the terminal device, a power headroom report to the base station includes:

sending, by the terminal device, the report to the base station in a first reporting manner, where the report includes at least one of the following: identification information of a serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

In one embodiment, the sending, by the terminal device, a power headroom report to the base station includes:

sending, by the terminal device, the report to the base station in a second reporting manner, where the report includes at least one of the following: identification information of a serving cell, power headroom information corresponding to each uplink subcarrier in the serving cell, power headroom information corresponding to each bandwidth part in the serving cell, or maximum transmit power information corresponding to the serving cell.

Therefore, new reporting manners (including the first reporting manner and the second reporting manner) are provided in this embodiment of this disclosure, which can be applicable to reporting the power headroom report at a granularity of an uplink subcarrier or a bandwidth part.

In one embodiment, the report further includes first indication information, and the first indication information is used to indicate whether to report power headroom information corresponding to an uplink subcarrier, or is used to indicate whether to report power headroom information corresponding to a bandwidth part.

In one embodiment, before the sending, by the terminal device, a report to the base station, the method further includes:

configuring, by the terminal device, corresponding maximum transmit power for each uplink subcarrier, where maximum transmit power corresponding to all uplink subcarriers is the same or different;

configuring, by the terminal device, corresponding maximum transmit power for each bandwidth part, where maximum transmit power corresponding to all bandwidth parts is the same or different;

obtaining, by the terminal device from a physical layer, at least one of a type corresponding to each uplink subcarrier, maximum transmit power corresponding to the type, and power headroom information corresponding to the type; or obtaining, by the terminal device from a physical layer, at least one of a type corresponding to each bandwidth part, maximum transmit power corresponding to the type, and power headroom information corresponding to the type.

Therefore, based on the uplink subcarrier or the bandwidth part, the terminal device configures the maximum transmit power, or obtains at least one of the type corresponding to each uplink subcarrier, the maximum transmit power corresponding to the type, and the power headroom information corresponding to the type.

In one embodiment, before the sending, by the terminal device, a report to the base station, the method further includes:

performing, by the terminal device, uplink power control; and after the uplink power control, calculating, by the terminal device, the power headroom of each uplink subcarrier or the power headroom of each bandwidth part.

Therefore, the terminal device calculates the power headroom based on the uplink subcarrier or the bandwidth part.

According one embodiment, an uplink data transmission method is provided, including:

sending, by a base station, an uplink grant to a terminal device; and receiving, by the base station, a report from the terminal device, where the report includes a power headroom of each of at least one uplink subcarrier, and/or a power headroom of each of at least one bandwidth part.

Optionally, the report includes a report on a first media access control MAC entity, the report on the first MAC entity is triggered by the terminal device, and in a serving cell in which the first MAC entity is located, at least one of the following that corresponds to the first MAC entity is activated, configured, or reconfigured: an uplink subcarrier, a bandwidth part, and an uplink shared channel.

Optionally, a serving cell includes a plurality of MAC entities, and the serving cell is a serving cell in a process in which the terminal device performs multi-connectivity communication. The terminal device triggers a report on each of the plurality of MAC entities, or triggers only a report on a first MAC entity, and at least one of the following that correspond to the first MAC entity in the plurality of MAC entities is activated, configured, or reconfigured: an uplink subcarrier, a bandwidth part, and an uplink shared channel.

In one embodiment, the report includes at least one of the following: identification information of a serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

In one embodiment, the report includes at least one of the following: identification information of a serving cell, power headroom information corresponding to each uplink subcarrier in the serving cell, power headroom information corresponding to each bandwidth part in the serving cell, or maximum transmit power information corresponding to the serving cell.

In one embodiment, the report further includes first indication information, and the first indication information is used to indicate whether to report power headroom information corresponding to an uplink subcarrier, or is used to indicate whether to report power headroom information corresponding to a bandwidth part.

According to one embodiment, an uplink data transmission method is provided, where the method is applied to a multi-connectivity communications system, the multi-connectivity communications system includes a plurality of media access control MAC entities, and the method includes:

determining, by a terminal device, a reporting manner specific to a plurality of MAC entities; and sending, by the terminal device, a report to a base station in the reporting manner specific to the plurality of MAC entities, where the report includes a subreport corresponding to each MAC entity, and the subreport corresponding to each MAC entity is sorted in order.

This disclosure provides a new power headroom report reporting format for the multi-connectivity communications system, so that subreports corresponding to the plurality of MAC entities may be stacked together in order and reported. Therefore, the new PHR reporting format is formed, which has better scalability. In contrast, reporting of a PHR in the multi-connectivity communications system is not supported in the prior art.

In one embodiment, the report includes a plurality of pieces of bitmap information, the plurality of pieces of bitmap information are located before subreports corresponding to the plurality of MAC entities, and each piece of bitmap information is used to indicate power headroom information corresponding to a serving cell of each MAC entity.

Alternatively, the report includes first bitmap information, the first bitmap information is located before subreports corresponding to the plurality of MAC entities, and the first bitmap information is used to indicate power headroom information corresponding to the plurality of MAC entities.

Alternatively, if the terminal device and the base station are in a same MAC entity, the report includes second bitmap information, and the second bitmap information is used to indicate a PH set corresponding to a type $\frac{1}{3}$.

Alternatively, if the terminal device and the base station are not in a same MAC entity, the report includes third bitmap information and fourth bitmap information, where the third bitmap information is used to indicate a PH set corresponding to a type $\frac{1}{3}$ in a MAC entity in which the terminal device is located, and the fourth bitmap information is used to indicate a PH set corresponding to a type 2 in the MAC entity in which the terminal device is located.

In one embodiment, the plurality of MAC entities include a MAC entity of an LTE version and a MAC entity of a version later than the LTE version. The MAC entity of the LTE version reports power headroom information to the base station based on a cell, while the MAC entity of the version later than the LTE version reports power headroom information to the base station based on an uplink subcarrier or a bandwidth part.

According to one embodiment, an uplink data transmission method is provided, where the method is applied to a multi-connectivity communications system, the multi-connectivity communications system includes a plurality of media access control MAC entities, and the method includes:

sending, by a base station, an uplink grant to a terminal device; and receiving, by the base station, a report sent by the terminal device, where the report includes a subreport corresponding to each MAC entity, and the subreport corresponding to each MAC entity is sorted in order.

This disclosure provides a new power headroom report reporting format for the multi-connectivity communications system. The base station may receive a power headroom report that is reported by the terminal device by stacking subreports corresponding to the plurality of MAC entities together in order. Therefore, the new PHR reporting format is formed, which has better scalability. In contrast, reporting of a PHR in the multi-connectivity communications system is not supported in the prior art.

In one embodiment, the report includes a plurality of pieces of bitmap information, the plurality of pieces of bitmap information are located before subreports corresponding to the plurality of MAC entities, and each piece of bitmap information is used to indicate power headroom information corresponding to a serving cell of each MAC entity.

Alternatively, the report includes first bitmap information, the first bitmap information is located before subreports corresponding to the plurality of MAC entities, and the first bitmap information is used to indicate power headroom information corresponding to the plurality of MAC entities.

Alternatively, if the terminal device and the base station are in a same MAC entity, the report includes second bitmap information, and the second bitmap information is used to indicate a PH set corresponding to a type ⅓.

Alternatively, if the terminal device and the base station are not in a same MAC entity, the report includes third bitmap information and fourth bitmap information, where the third bitmap information is used to indicate a PH set corresponding to a type ⅓ in a MAC entity in which the terminal device is located, and the fourth bitmap information is used to indicate a PH set corresponding to a type 2 in the MAC entity in which the terminal device is located.

In one embodiment, the plurality of MAC entities include a MAC entity of an LTE version and a MAC entity of a version later than the LTE version. The MAC entity of the LTE version reports power headroom information to the base station based on a cell, while the MAC entity of the version later than the LTE version reports power headroom information to the base station based on an uplink subcarrier or a bandwidth part.

According to one embodiment, a terminal device is provided, and is configured to perform the method in the first aspect or any possible implementation of the first aspect. Specifically, the terminal device includes a module configured to perform the method in the first aspect or any possible implementation of the first aspect.

According to one embodiment, a base station is provided, and is configured to perform the method in the second aspect or any possible implementation of the second aspect. Specifically, the base station includes a module configured to perform the method in the second aspect or any possible implementation of the second aspect.

According to one embodiment, a terminal device is provided, and is configured to perform the method in the third aspect or any possible implementation of the third aspect. Specifically, the terminal device includes a module configured to perform the method in the third aspect or any possible implementation of the third aspect.

According to one embodiment, a base station is provided, and is configured to perform the method in the fourth aspect or any possible implementation of the fourth aspect. Specifically, the base station includes a module configured to perform the method in the fourth aspect or any possible implementation of the fourth aspect.

According to one embodiment, a terminal device is provided, where the terminal device includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method in the first aspect or any possible implementation of the first aspect.

According to one embodiment, a base station is provided, where the base station includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method in the second aspect or any possible implementation of the second aspect.

According to one embodiment, a terminal device is provided, where the terminal device includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method in the third aspect or any possible implementation of the third aspect.

According to one embodiment, a base station is provided, where the base station includes a processor, a memory, and a transceiver. The processor is connected to the memory and the transceiver. The memory is configured to store an instruction; the processor is configured to execute the instruction; and the transceiver is configured to communicate with another network element under control of the processor. When the processor executes the instruction stored in the memory, the execution enables the processor to perform the method in the fourth aspect or any possible implementation of the fourth aspect.

According to one embodiment, a computer-readable storage medium is provided, where the computer-readable storage medium stores a program, and the program enables a terminal device to perform the uplink data transmission method in the first aspect or any one of the implementations of the first aspect.

According to one embodiment, a computer-readable storage medium is provided, where the computer-readable storage medium stores a program, and the program enables a base station to perform the uplink data transmission method in the second aspect or any one of the implementations of the second aspect.

According to one embodiment, a computer-readable storage medium is provided, where the computer-readable storage medium stores a program, and the program enables a terminal device to perform the uplink data transmission method in the third aspect or any one of the implementations of the third aspect.

According to one embodiment, a computer-readable storage medium is provided, where the computer-readable storage medium stores a program, and the program enables a base station to perform the uplink data transmission method in the fourth aspect or any one of the implementations of the fourth aspect.

According to one embodiment, a communications chip is provided, where the communications chip stores an instruction, and when the instruction is run on a terminal device, the communications chip is enabled to perform the method in any possible implementation of any one of the foregoing aspects.

According to one embodiment, a computer program product including an instruction is provided. When the instruction is run on a computer, the computer is enabled to perform the method in any one of the aspects or the possible implementations of the aspects.

DESCRIPTION OF EMBODIMENTS

The following describes technical solutions in this disclosure with reference to accompanying drawings.

In the descriptions of the embodiments of this disclosure, "at least one" may be explained as "one" or "a plurality of".

In the descriptions of the embodiments of this disclosure, unless otherwise stated, "a plurality of" or "a plurality of" means two or more than two.

It should be understood that the technical solutions in the embodiments of this disclosure may be applied to various communications systems, for example, a current communications system such as a long term evolution (LTE) system, an LTE frequency division duplex (FDD) system, an LTE time division duplex (TDD) system, a code division multiple access (CDMA) system, a universal mobile telecommunications system (UMTS), and a wireless local area network (WLAN); and in particular, to a further 5G new radio (NR) system, a 5G system, or a communications system based on an orthogonal frequency division multiplexing (OFDM) technology. This disclosure is described by using the 5G system as an example, but is not limited to the 5G system. The solutions in this disclosure may be applied as long as a resource should be allocated by one of two communication parties.

Figure 1:
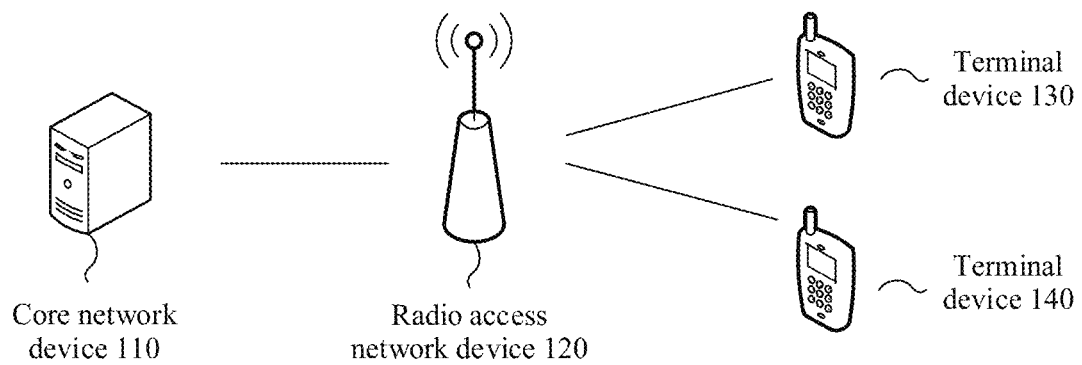
FIG. 1 is a schematic architectural diagram of a mobile communications system to which an embodiment of this disclosure is applied.

FIG. 1 is a schematic architectural diagram of a mobile communications system to which an embodiment of this disclosure is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices that are independent of each other. Alternatively, functions of the core network device and logical functions of the radio access network device may be integrated into a same physical device. Alternatively, some functions of the core network device and some functions of the radio access network device may be integrated into one physical device. The terminal device may be at a fixed location or may be mobile. It should be understood that FIG. 1 is merely a schematic diagram, and the communications system may further include another network device, for example, may further include a wireless relay device and a wireless backhaul device (not shown in FIG. 1). Quantities of core network devices, radio access network devices, and terminal devices included in the mobile communications system are not limited in the embodiments of this disclosure.

The radio access network device is an access device by which the terminal device accesses the mobile communications system in a wireless manner. The radio access network device may be a NodeB, an evolved NodeB, a gNB in a 5G mobile communications system, a base station in a future mobile communications system, an access node in a Wi-Fi system, or the like. A specific technology and a specific device form that are used by the radio access network device are not limited in the embodiments of this disclosure.

The terminal device may also be referred to as a terminal, user equipment (UE), a mobile station (MS), a mobile terminal (MT), or the like. The terminal device may be a mobile phone, a tablet, a computer with a wireless transceiving function, a virtual reality (VR) terminal device, an augmented reality (AR) terminal device, a wireless terminal in industrial control, a wireless terminal in self driving, a wireless terminal in remote surgery (e.g., remote medical surgery), a wireless terminal in a smart grid, a wireless terminal in transportation safety, a wireless terminal in a smart city, a wireless terminal in a smart home, or the like.

The radio access network device and the terminal device may be deployed on land, including being deployed indoors or outdoors, or being handheld or vehicle-mounted; or may be deployed on water; or may be deployed in an airplane, a balloon, and a satellite in the air. An application scenario of the radio access network device and the terminal device is not limited in the embodiments of this disclosure. For ease of description, the following uses an example in which the radio access network device is a base station for description.

The embodiments of this disclosure may be applied to downlink signal transmission, or may be applied to uplink signal transmission, or may be applied to device-to-device (D2D) signal transmission. For the downlink signal transmission, a sending device is the radio access network device, and a corresponding receiving device is the terminal device. For the uplink signal transmission, a sending device is the terminal device, and a corresponding receiving device is the radio access network device. For the D2D signal transmission, a sending device is the terminal device, and a corresponding receiving device is also the terminal device. A signal transmission direction is not limited in the embodiments of this disclosure.

Communication may be performed between the radio access network device and the terminal device and between terminal devices by using a licensed spectrum, or by using an unlicensed spectrum, or by using both a licensed spectrum and an unlicensed spectrum. Communication may be performed between the radio access network device and the terminal device and between terminal devices by using a spectrum below 6 gigahertz (GHz), or by using a spectrum above 6 GHz, or by using both a spectrum below 6 GHz and a spectrum above 6 GHz. A spectrum resource used between the radio access network device and the terminal device is not limited in the embodiments of this disclosure. For ease of description, the following uses an example in which the radio access network device is a base station for description.

Figure 2:
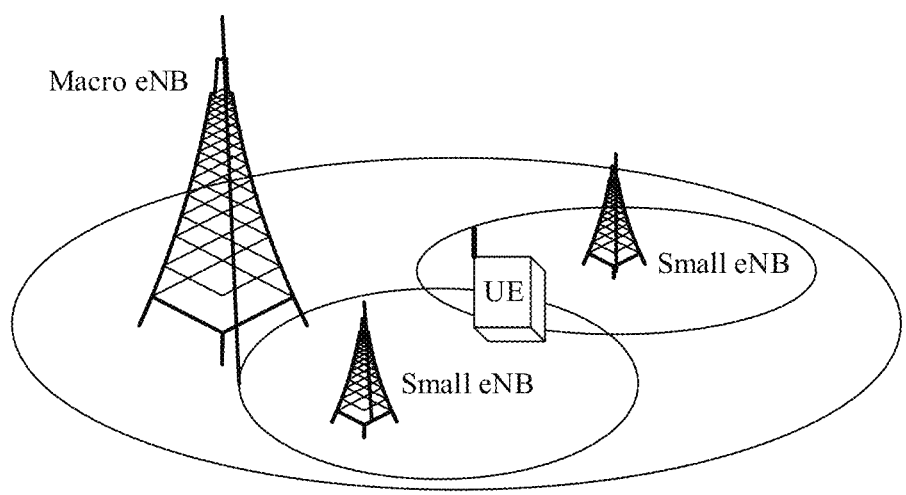
FIG. 2 is an architectural diagram of another wireless communications system according to an embodiment of this disclosure.

FIG. 2 is an architectural diagram of another wireless communications system according to an embodiment of this disclosure. As shown in FIG. 2, UE is located in a coverage area of one or more cells (carriers) provided by a macro eNB or a small eNB. There may be one or more cells serving the UE. When a plurality of cells serve the UE, the UE may operate in a carrier aggregation (CA) mode, a dual connectivity mode, a multi-connectivity mode, or a coordinated multipoint transmission (CoMP) mode. At least one of the cells provides more than one numerology (e.g., air interface format) to provide a radio resource for the UE.

Use of a spectrum in NR is extended to a higher frequency band, such as a C-band or even higher. However, data transmission on a high frequency band results in relatively high path attenuation and relatively poor coverage. For a downlink, because a base station has high transmit power, strong radio frequency devices, and more antennas, attenuation of a high frequency data channel can be mitigated. However, for an uplink, a problem of small coverage is relatively difficult to resolve due to a limited capability of a terminal device. Therefore, a design of a supplementary uplink (SUL) is provided in NR. To be specific, a low frequency link is added as a supplement to an original high frequency link, to improve reliability and coverage of the uplink.

In addition, due to high bandwidth, a high frequency, different air interface formats, and a higher capability requirement of the terminal device in high frequency transmission, a concept of a bandwidth part (BWP) is introduced in NR. Main application scenarios of the BWP include at least one of the following application scenarios: (1) supporting a terminal device with a smaller bandwidth capability; (2) reducing energy consumption of a terminal device by changing a bandwidth; (3) supporting frequency division multiplexing on different numerologies (numerology); (4) supporting a non-contiguous spectrum; or (5) supporting forward compatibility.

The foregoing concepts of the supplementary uplink SUL and the bandwidth part BWP are introduced in NR. However, a PHR (PHR) is reported on a per cell basis in the prior art, and this cannot resolve a problem of reporting the power headroom report based on the supplementary uplink SUL and the bandwidth part BWP. The PHR should be reported at a finer granularity. Therefore, this disclosure provides an uplink data transmission method, to report the PHR for each an uplink subcarrier (carrier) and/or a BWP.

For ease of understanding, the following describes some concepts related to PHR reporting.

The PHR is a set of media access control (MAC) control elements (CE) including a power headroom (PH). Each PH indicates a difference between allowed maximum transmit power and transmission power of a terminal device in each cell. Specifically, the terminal device reports the PHR to the base station based on a physical resource and/or a modulation and coding scheme that are/is indicated by an uplink grant (UL grant), to notify the base station of a power headroom status of the terminal device. If the terminal device needs to send data, the base station allocates an appropriate uplink transmission resource to the terminal device based on the PHR and/or a BSR reported by the terminal device, and then delivers a UL grant to notify the terminal device of the uplink transmission resource allocated to the terminal device, so that the terminal device reports the data. It should be understood that two steps are required to send the PHR: triggering; and obtaining uplink transmission resources sufficient to carry the PHR.

There are three PH types (Type) in LTE:

Type 1: When a power headroom of a subframe i of a serving cell c is calculated, only transmission power of a physical uplink shared channel (PUSCH) is calculated, where c represents a number of the serving cell, and i represents a number of the subframe.

Type 2: When a power headroom of a subframe i of a serving cell c is calculated, transmission power of a PUSCH and a physical uplink control channel (physical uplink control channel, PUCCH) is calculated.

Type 3: When a power headroom of a subframe i of a serving cell c is calculated, transmission power of a PUSCH and a sounding reference signal (SRS) is calculated.

Figure 3:
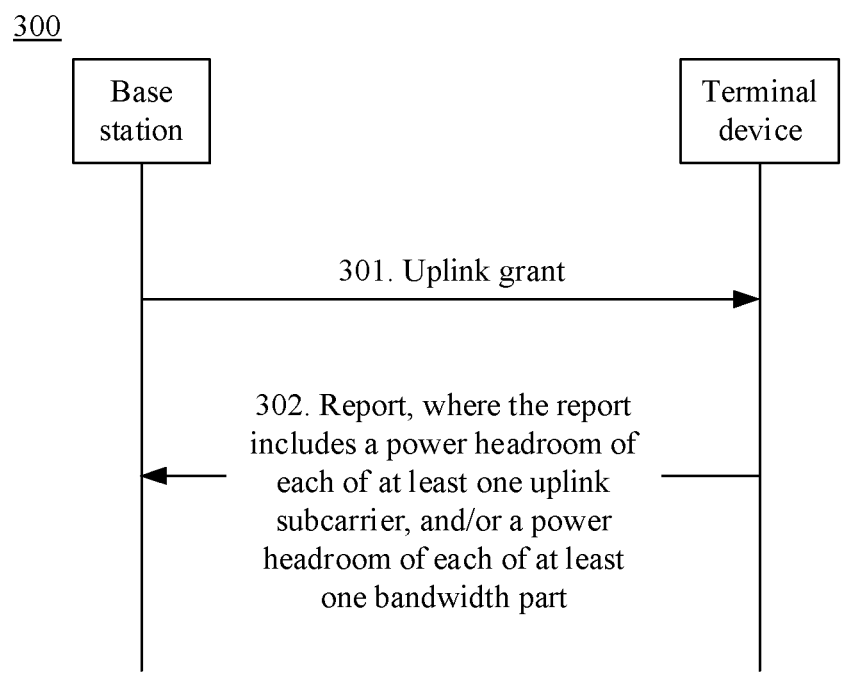
FIG. 3 is a schematic interaction diagram of an uplink data transmission method according to an embodiment of this disclosure.

FIG. 3 is a schematic interaction diagram of an uplink data transmission method 300 according to an embodiment of this disclosure. For example, a base station in FIG. 3 may be the radio access network device 120 in FIG. 1, and a terminal device in FIG. 3 may be the terminal device 130 or the terminal device 140 in FIG. 1. As shown in FIG. 3, the method 300 includes the following steps:

S301. The base station sends an uplink grant (UL grant) to the terminal device.

Correspondingly, the terminal device receives the uplink grant from the base station.

S302. The terminal device sends a report to the base station, where the report includes a power headroom of each of at least one uplink subcarrier, and/or a power headroom of each of at least one bandwidth part.

Correspondingly, the base station receives the report.

Optionally, the report may be a power headroom report PHR, or another message including the power headroom. This is not limited in this embodiment of this disclosure. For ease of description, the following uses an example in which the report is the PHR for description.

Optionally, each uplink subcarrier may be an active or inactive uplink subcarrier, for example, a UL carrier, a SUL carrier, or a non-SUL carrier.

It should be understood that the uplink data transmission method in this embodiment of this disclosure is described only by using an uplink subcarrier as an example. Actually, this embodiment of this disclosure is not limited thereto. The method in this embodiment of this disclosure may also be applied to an uplink carrier. For brevity, a general description is provided herein: The uplink subcarrier throughout the embodiments of this disclosure may be replaced by the uplink carrier, to implement a solution related to the uplink carrier. For example, the report includes a power headroom of each of at least one uplink carrier, and/or a power headroom of each of at least one bandwidth part, and/or the like. A person skilled in the art may definitely derive the solution related to the uplink carrier from the solution related to the uplink subcarrier in the embodiments of this disclosure. Details are not described below again.

Optionally, each bandwidth part may be an active or inactive bandwidth part.

Optionally, the at least one uplink subcarrier and the at least one bandwidth part may be located in a same serving cell.

Optionally, the at least one bandwidth part may be bandwidth parts of a same uplink subcarrier or different uplink subcarriers. This is not limited in this embodiment of this disclosure.

Specifically, a process in which the terminal device sends the PHR to the base station is as follows: A PHR MAC CE is constructed at a MAC layer of the terminal device based on power headroom PH information and is assembled into a MAC protocol data unit (PDU), and then the MAC PDU is sent to the base station through the physical layer. It should be understood that a specific manner used to send the PHR is not limited in this embodiment of this disclosure.

In this embodiment of this disclosure, the terminal device sends the report to the base station, where the report includes the power headroom of each of the at least one uplink subcarrier, and/or the power headroom of each of the at least one bandwidth part. Therefore, the power headroom is reported at a finer granularity, and this helps improve accuracy of scheduling by the base station.

Optionally, in an embodiment, the report includes a report on a first media access control MAC entity, and the method 300 includes:

in a serving cell in which the first MAC entity is located, activating, configuring, or reconfiguring at least one of the following that correspond to the first MAC entity: an uplink subcarrier, a bandwidth part, and an uplink shared channel; and triggering, by the terminal device, the report on the first MAC entity.

Specifically, this embodiment of this disclosure provides a new condition for triggering the power headroom report PHR. The serving cell in which the first MAC entity is located is used as an example, and the following case is included: The PHR on the first MAC entity may be triggered if the uplink subcarrier corresponding to the first MAC entity in the serving cell is activated, configured, or reconfigured; or if the bandwidth part corresponding to the first MAC entity in the serving cell is activated, configured, or reconfigured; or if the uplink shared channel (e.g., a PUSCH) corresponding to the first MAC entity in the serving cell is activated, configured, or reconfigured. It should be understood that the foregoing cases may be used in combination. This is not limited.

Optionally, the foregoing trigger condition may also be applied to a multi-connectivity communications system (e.g., a dual-connectivity communications system).

Optionally, in an embodiment, a serving cell includes a plurality of MAC entities and is a serving cell in a process in which the terminal device performs multi-connectivity communication, and the method 300 further includes:

activating, configuring, or reconfiguring at least one of the following that correspond to a first MAC entity in the plurality of MAC entities: an uplink subcarrier, a bandwidth part, and an uplink shared channel; and triggering, by the terminal device, a power headroom report on each of the plurality of MAC entities, or triggering a power headroom report only on a first MAC entity.

Specifically, in multi-connectivity (e.g., in dual-connectivity), the terminal device triggers the PHR on each of the MAC entities or only the PHR on the first MAC entity if the foregoing trigger condition is met, that is, at least one of an uplink subcarrier, a bandwidth part, or an uplink shared channel corresponding to a specific MAC entity (e.g., the first MAC entity) in the serving cell is activated, configured, or reconfigured.

Therefore, in this embodiment of this disclosure, a new PHR trigger condition is provided for a serving cell in which at least one uplink subcarrier or at least one bandwidth part is configured. When at least one of the uplink subcarrier, the bandwidth part, and the uplink shared channel is activated or reconfigured, the terminal device can report the PHR in a timely manner, so that scheduling is well performed by the base station for the terminal device.

Further, to implement reporting of a PHR of an uplink subcarrier or a bandwidth part, this embodiment of this disclosure further provides a new PHR MAC CE format, to support reporting of PHRs of a plurality of uplink subcarriers and bandwidth parts.

Optionally, in an embodiment, S302 includes:

sending, by the terminal device, the report to the base station in a first reporting manner, where the report includes at least one of the following: identification information of a serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

Specifically, the first reporting manner may be understood as a reporting format determined by the terminal device based on each uplink subcarrier or each bandwidth part. The terminal device sends the report to the base station in the first reporting manner.

Optionally, in a serving cell, power headroom information (e.g., PH values) of all active or inactive uplink subcarriers or bandwidth parts is stacked together in a specific order and reported, and maximum transmit power information corresponding to a type is added after each piece of power headroom information. Optionally, an order of reporting power headroom information is not limited. The power headroom information may be reported in ascending order or descending order of numbers of uplink subcarriers or bandwidth parts, or reported in an order according to another rule.

For example, in a serving cell, a type of power headroom information of each uplink subcarrier or each bandwidth part includes a type 2 and a type ⅓, and it is determined that the first reporting manner is as follows: Maximum transmit power corresponding to the type 2 is added after type 2 power headroom information that corresponds to an uplink subcarrier or a bandwidth part, or maximum transmit power corresponding to the type ⅓ is added after type ⅓ power headroom information that corresponds to an uplink subcarrier or a bandwidth part.

For example, a plurality of type 2 PHs of a plurality of active or inactive uplink subcarriers or bandwidth parts that are configured in a serving cell may be placed together in a specific order in a PHR format. Optionally, for each type 2 PH, if there is an allocated uplink resource, maximum transmit power corresponding to the type 2 PH should be added after the type 2 PH. Alternatively, even if there is no allocated uplink resource, maximum transmit power corresponding to the type 2 PH also should be added after the type 2 PH.

For another example, a plurality of type ⅓ PHs of a plurality of active or inactive uplink subcarriers or bandwidth parts that are configured in a serving cell may be placed together in a specific order in a PHR format. Optionally, for each type ⅓ PH, if there is an allocated uplink resource, maximum transmit power corresponding to the type ⅓ PH should be added after the type ⅓ PH. Alternatively, even if there is no allocated uplink resource, maximum transmit power corresponding to the type ⅓ PH also should be added after the type ⅓ PH.

Figure 4:
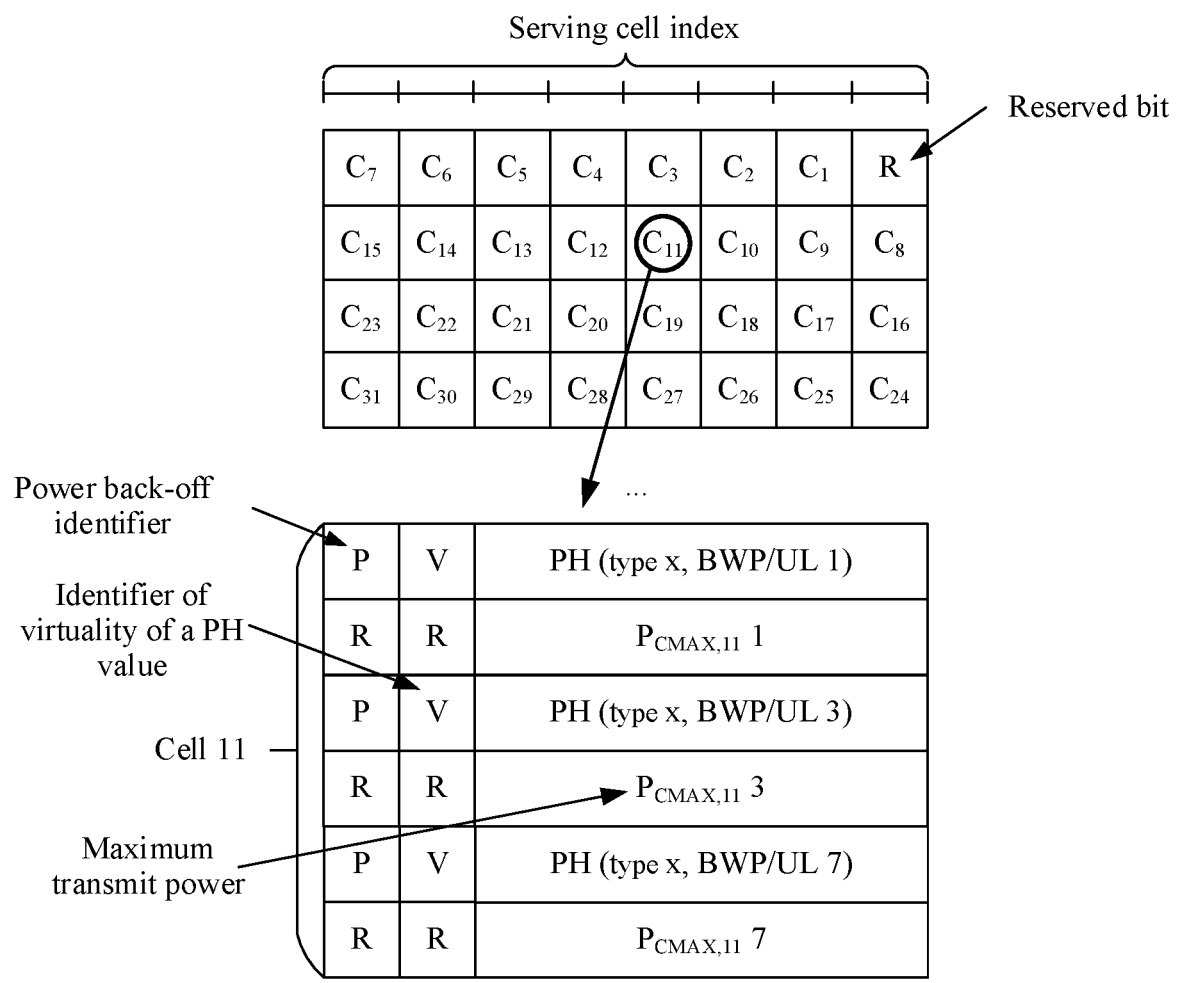
FIG. 4 is a schematic diagram of an example of a reporting manner according to an embodiment of this disclosure.

FIG. 4 is a schematic diagram of an example of a reporting manner according to an embodiment of this disclosure. As shown in FIG. 4, $C_1$ to $C_{24}$ in a first row to a fourth row are serving cell indexes, and R indicates a reserved bit. A fifth row to a tenth row show PHs in a cell 11, P is used to indicate whether power back-off is performed, V is used to indicate whether a PH value is real or virtual, and R indicates a reserved bit. A PH (type x, BWP/UL 1) is used as an example. For the type x in parentheses of the PH, x indicates a corresponding type (which may be a type 2 or a type ⅓). BWP indicates a bandwidth part, 1 indicates a number of an uplink subcarrier, and corresponding maximum transmit power $PC_{MAX,11}$ 1 is added after the PH (type x, BWP/UL 1). Corresponding maximum transmit power is added after each of subsequent PH values, and the corresponding maximum transmit power and the PH values are sorted in order.

Alternatively, in an optional embodiment, S302 includes:
sending, by the terminal device, the report to the base station in a second reporting manner, where the report includes at least one of the following: identification information of a serving cell, power headroom information corresponding to each uplink subcarrier in the serving cell, power headroom information corresponding to each bandwidth part in the serving cell, or maximum transmit power information corresponding to the serving cell.

Specifically, the second reporting manner may be understood as a reporting format determined by the terminal device based on each uplink subcarrier or each bandwidth part. The terminal device sends the report to the base station in the second reporting manner.

Optionally, in a serving cell, power headroom information (e.g., PH values) of all active or inactive uplink subcarriers or bandwidth parts is stacked together in a specific order and reported, and maximum transmit power information corresponding to the serving cell is added before or after each piece of power headroom information. Optionally, an order of reporting power headroom information is not limited. The power headroom information may be reported in ascending order or descending order of numbers of uplink subcarriers or bandwidth parts, or reported according to another rule.

For example, in a serving cell, a type of power headroom information of each uplink subcarrier or each bandwidth part includes a type 2 or a type ⅓, and it is determined that the second reporting manner is as follows: Maximum transmit power corresponding to the serving cell is added before or after all power headroom information corresponding to each uplink subcarrier or bandwidth part in a same serving cell.

Optionally, for a same serving cell, if a PUSCH, a PUCCH, or an SRS is configured for the terminal device in the serving cell, maximum transmit power corresponding to a type of each PH is added after the PH.

Figure 5:
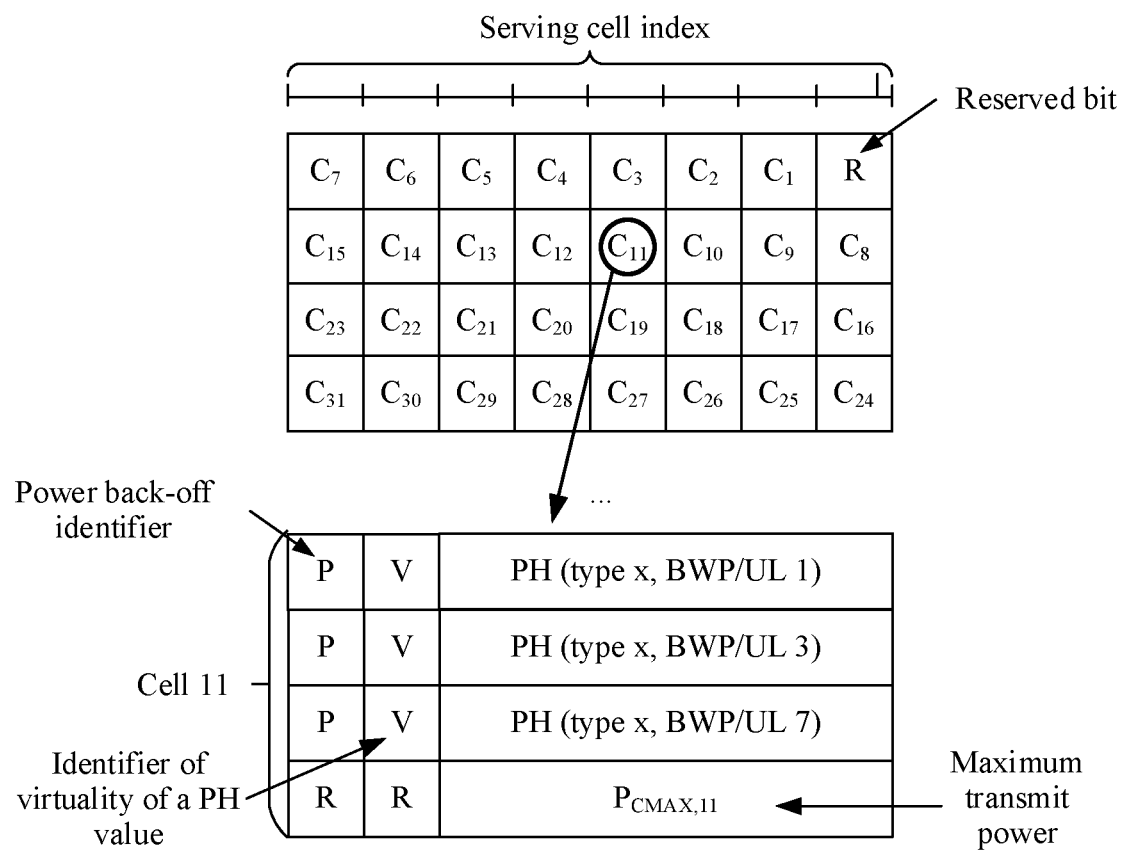
FIG. 5 is a schematic diagram of another example of a reporting manner according to an embodiment of this disclosure.

For example, FIG. 5 is a schematic diagram of another example of a reporting manner according to an embodiment of this disclosure. As shown in FIG. 5, $C_1$ to $C_{31}$ in a first row to a fourth row are serving cell indexes, and R indicates a reserved bit. A fifth row to an eighth row show PHs in a cell 11, P is used to indicate whether power back-off is performed, V is used to indicate whether a PH value is real or virtual, and R indicates a reserved bit. A PH (type x, BWP/UL 1) is used as an example. For the type x in parentheses of the PH, x indicates a corresponding type (which may be a type 2 or a type 3). BWP indicates a bandwidth part, and 1 indicates a number of an uplink subcarrier. Same maximum transmit power $P_{CMAX,11}$ is added after all PHs (including a PH (type x, BWP/UL 1), a PH (type x, BWP/UL 3), and a PH (type x, BWP/UL 7)).

Further, if a plurality of active or inactive bandwidth parts are configured on an uplink subcarrier (e.g., a first subcarrier) in the at least one uplink subcarrier, a reporting format of a PHR may be as follows: Power headroom information of all the bandwidth parts of the uplink subcarrier are sorted in a specific order, and then power headroom information of remaining uplink subcarriers is sorted in order. It should be understood that the first subcarrier may be any one of the at least one uplink subcarrier. Optionally, the report may include power headroom information corresponding to a plurality of bandwidth parts of the first subcarrier. Optionally, the first subcarrier may be sorted based on a number of the first subcarrier in the at least one uplink subcarrier. Optionally, the terminal device may configure an independent maximum transmit power for an active or inactive bandwidth part on each uplink subcarrier, or may configure a common maximum transmit power for all active or inactive bandwidth parts.

Figure 6:
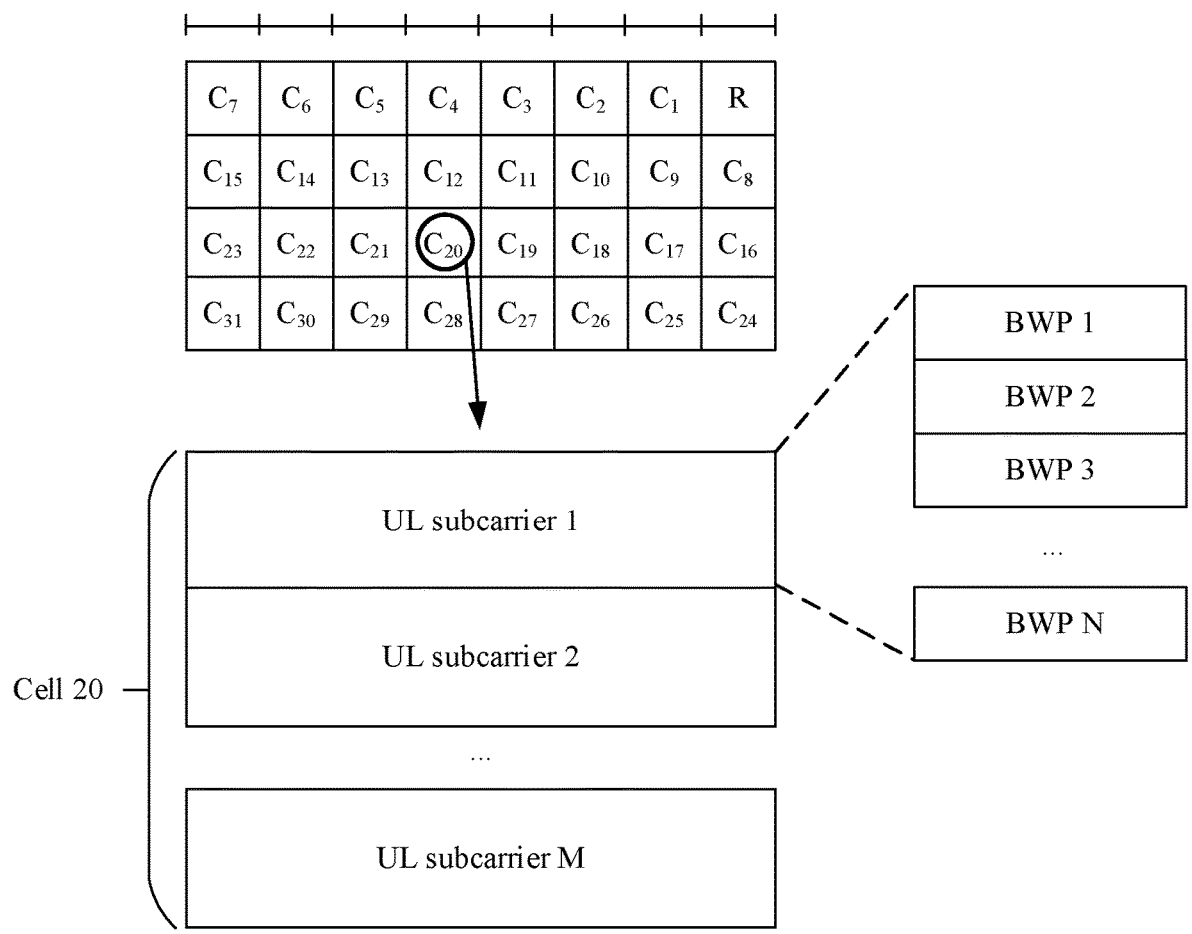
FIG. 6 is a schematic diagram of still another example of a reporting manner according to an embodiment of this disclosure.

For example, as shown in FIG. 6, there are M uplink (UL) subcarriers in a cell 20, and an uplink subcarrier 1 includes N BWPs. In this case, a reporting format of a PHR may be as follows: PH values corresponding to the N BWPs are sorted in order, and then PH values of uplink (UL) subcarriers 2 to M are sorted in order.

It should be understood that FIG. 6 is merely described by using an example in which the uplink subcarrier 1 includes the N BWPs, and does not constitute a limitation on this embodiment of this disclosure. Any one of the M uplink (UL) subcarriers may include a plurality of BWPs, and the reporting manner in this embodiment of this disclosure is also applicable.

Further, the report may include first indication information, and the first indication information is used to indicate whether to report power headroom information corresponding to an uplink subcarrier, or is used to indicate whether to report power headroom information corresponding to a bandwidth part.

Optionally, the first indication information may be represented by using a bitmap. For example, 0 is used to indicate that a PH value is not reported, and 1 is used to indicate that a PH value is reported.

Figure 7:
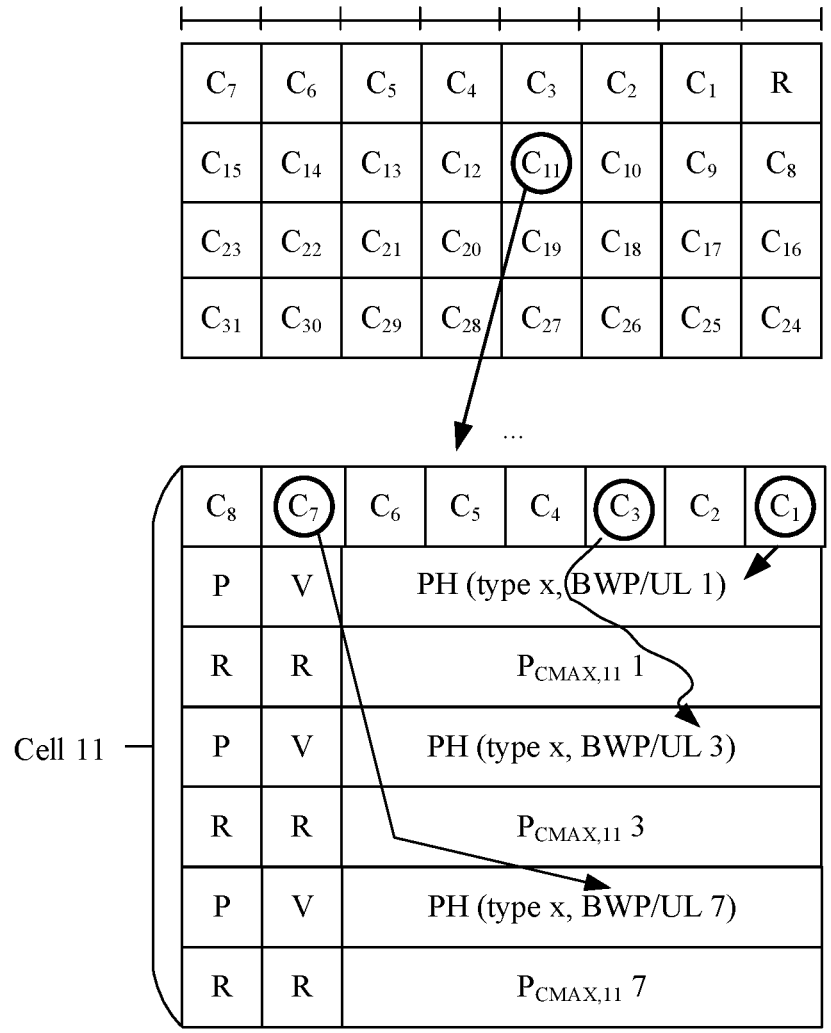
FIG. 7 is a schematic diagram of yet another example of a reporting manner according to an embodiment of this disclosure.

In other words, for the reporting format in FIG. 4 or FIG. 5, one piece of indication information may be added to indicate whether to report. For example, as shown in FIG. 7, corresponding to the type in FIG. 4, reference may be made to the foregoing descriptions for explanations about specific parameters, and a difference lies in that indication information is added before each PH value. Specifically, $C_7$ is used to indicate whether to report a PH (type x, BWP/UL 7) corresponding to an uplink subcarrier 7, $C_3$ is used to indicate whether to report a PH (type x, BWP/UL 3) corresponding to an uplink subcarrier 3, and $C_1$ is used to indicate whether to report a PH (type x, BWP/UL 1) corresponding to an uplink subcarrier 1.

Figure 8:
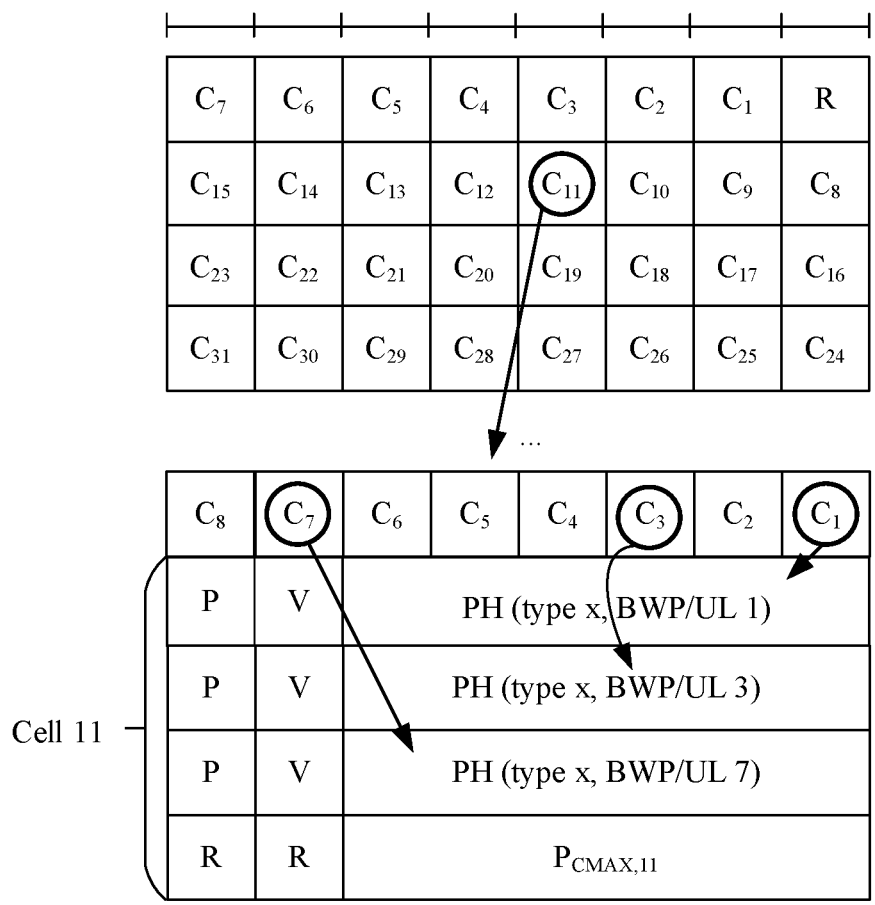
FIG. 8 is a schematic diagram of still yet another example of a reporting manner according to an embodiment of this disclosure.

Similarly, for another example, as shown in FIG. 8, corresponding to the type in FIG. 5, reference may be made to the foregoing descriptions for explanations about specific parameters, and a difference lies in that indication information is added before each PH value. Specifically, $C_7$ is used to indicate whether to report a PH (type x, BWP/UL 7) corresponding to an uplink subcarrier 7, $C_3$ is used to indicate whether to report a PH (type x, BWP/UL 3) corresponding to an uplink subcarrier 3, and $C_1$ is used to indicate whether to report a PH (type x, BWP/UL 1) corresponding to an uplink subcarrier 1.

It should be understood that examples in FIG. 4 to FIG. 8 are provided merely for helping a person skilled in the art understand the embodiments of this disclosure, instead of limiting the embodiments of this disclosure to specific scenarios shown in the examples. Apparently, a person skilled in the art can make various equivalent modifications or changes based on the examples shown in FIG. 4 to FIG. 8, and such modifications or changes shall also fall within the scope of the embodiments of this disclosure.

Optionally, in an embodiment, before S302, the method 300 may include:

configuring, by the terminal device, corresponding maximum transmit power for each uplink subcarrier, where maximum transmit power corresponding to all uplink subcarriers is the same or different;

configuring, by the terminal device, corresponding maximum transmit power for each bandwidth part, where maximum transmit power corresponding to all bandwidth parts is the same or different;

obtaining, by the terminal device from the physical layer, at least one of a type corresponding to each uplink subcarrier, maximum transmit power corresponding to the type, and power headroom information corresponding to the type;

or obtaining, by the terminal device from the physical layer, at least one of a type corresponding to each bandwidth part, maximum transmit power corresponding to the type, and power headroom information corresponding to the type.

Specifically, the terminal device configures corresponding maximum transmit power for each uplink subcarrier or each bandwidth part in the following manners:

An $i^{th}$ uplink subcarrier or BWP in a cell c is used as an example. Maximum transmit power of the subcarrier or BWP may be configured in the following power interval:

$$P_{CMAX\_L,c\_UL\_i} \leq P_{CMAX,c\_UL\_i} \leq P_{CMAX\_H,c\_UL\_i}$$

Herein, $$P_{CMAX\_L,c\_UL\_i} = \text{MIN}\{P_{EMAX,c\_UL\_i} - \Delta T_{C,c\_UL\_i},\\ (P_{PowerClass} - \Delta P_{PowerClass}) - \text{MAX}(MPR_{c\_UL\_i} + A\text{-}\\ MPR_{c\_UL\_i} + \Delta T_{IB,c\_UL\_i} + \Delta T_{C,c\_UL\_i} + \Delta T_{ProSe}, P\text{-}\\ MPR_{c\_UL\_i})\}; \text{ and}$$

$$P_{CMAX\_H,c\_UL\_i} = \text{MIN}\{P_{EMAX,c\_UL\_i}, P_{PowerClass} - \\ \Delta P_{PowerClass}\}$$

Different from an existing protocol, $P_{EMAX,c\_UL\_i}$, P-$MPR_{c\_UL\_i}$, $\Delta T_{IB,c\_UL\_i}$, $\Delta T_{C,c\_UL\_i}$, $\Delta T_{C,c\_UL\_i}$, $MPR_{c\_UL\_i}$, and A-$MPR_{c\_UL\_i}$ are all configured in the cell c for each an uplink subcarrier or a BWP. For explanations or definitions of other parameters in the formulas, refer to definitions in a protocol 3GPP TS 36.101 (UE radio transmission and reception).

Alternatively, the terminal device configures maximum uplink transmit power for each active or inactive uplink subcarrier or bandwidth part in a cell.

Optionally, if a plurality of active or inactive bandwidth parts are configured on one active or inactive uplink subcarrier, the terminal device may configure different maximum uplink transmit power for each active or inactive bandwidth part based on the bandwidth part. Alternatively, the terminal device may configure common maximum uplink transmit power for all active or inactive bandwidth parts of an uplink subcarrier.

Alternatively, for an active or inactive uplink subcarrier or bandwidth part in each serving cell, the terminal device should obtain a corresponding type (that is, the type ⅓ or the type 2 described above) from the physical layer when reporting a PHR. For example, the terminal device learns, from the physical layer, that the type is the type ⅓. If there is an uplink resource (e.g., a UL grant) allocated by the base station on an active or inactive uplink subcarrier or bandwidth part in the cell, the terminal device obtains the maximum transmit power corresponding to the type ⅓ from the physical layer. Alternatively, for each active or inactive uplink subcarrier or bandwidth part in the cell, the terminal device directly obtains maximum transmit power corresponding to a type from the physical layer. For another example, if the terminal device learns, from the physical layer, that a PUCCH is configured or both a PUCCH and a PUSCH are (simultaneously) configured for an uplink subcarrier or a bandwidth part, the terminal device obtains a PH value corresponding to the type 2 and/or maximum transmit power corresponding to the type 2 from the physical layer. Alternatively, the terminal device obtains type 2 PH values from the physical layer for all active or inactive uplink subcarriers or BWPs, and maximum transmit power corresponding to the type 2 is used as a common maximum transmit power for all of the active or inactive uplink subcarriers or bandwidth parts.

In conclusion, the terminal device may configure maximum transmit power or obtain maximum transmit power from the physical layer based on an uplink subcarrier or a bandwidth part.

Optionally, in an embodiment, before S302, the method 300 further includes:

performing, by the terminal device, uplink power control; and after the uplink power control, calculating, by the terminal device, the power headroom of each uplink subcarrier or the power headroom of each bandwidth part.

Specifically, the terminal device may perform uplink power control in a serving cell based on each active or inactive uplink subcarrier or bandwidth part. Optionally, if a plurality of active bandwidth parts are configured on an uplink subcarrier, the terminal device may perform uplink power control based on each active bandwidth part. Therefore, compared with that in LTE in which uplink power control is performed on a per cell basis, uplink power control may be performed at a finer granularity in this embodiment of this disclosure.

Power control means changing transmit power of a terminal device within a specific range, to compensate for shadow fading and a path loss of a channel, suppress interference between intra-frequency cells, ensure network coverage, and meet an uplink capacity requirement of the terminal device. The power control is classified into PUSCH transmit power control, PUCCH transmit power control, and SRS transmit power control. Good power control can ensure service quality, reduce interference and energy consumption, and improve a capacity, and further ensure quality of service (QoS) of the terminal device.

It should be noted that the uplink power control herein includes open-loop power control and closed-loop power control. Specifically, the open-loop power control refers to the following: For a PRACH, during random access, an uplink synchronization process between the terminal device and the base station is not completed, and the terminal cannot obtain an indication from the base station. Therefore, the open-loop power control is performed, and the terminal device calculates transmit power based on parameter setting. The open-loop power control is also performed when a random access procedure message (Msg3) is sent on the PUSCH. The closed-loop power control refers to the following: For the PUSCH, the PUCCH, and the SRS, the base station performs closed-loop power control based on a status of uplink channel quality, calculates a power adjustment value, and sends the power adjustment value to the terminal device. Then, the terminal device calculates an uplink power value based on the power adjustment value.

Optionally, the uplink power control mainly includes PRACH power control, PUSCH power control, PUCCH power control, and SRS power control.

Optionally, after the uplink power control, the terminal device may obtain transmit power, and then subtract the transmit power from corresponding maximum transmit power described above to obtain a power headroom. For a method of calculating the power headroom, refer to the description in a standard 3GPP 36.213. Different from an existing protocol, in this embodiment of this disclosure, the power headroom is calculated based on an uplink subcarrier or a bandwidth part, that is, at a finer granularity.

Figure 9:
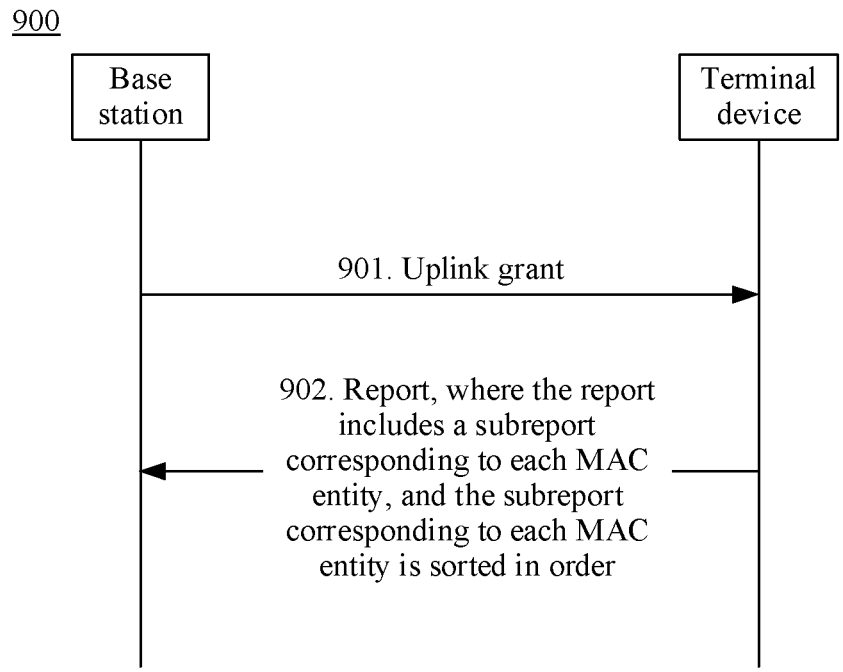
FIG. 9 is a schematic flowchart of an uplink data transmission method according to another embodiment of this disclosure.

This disclosure further provides another embodiment in which a power headroom information reporting format applicable to a multi-connectivity communications system is provided. FIG. 9 is a schematic flowchart of an uplink data transmission method 900 according to another embodiment of this disclosure. The method 900 is applied to a multi-connectivity communications system, and the multi-connectivity communications system includes a plurality of MAC entities. As shown in FIG. 9, the method includes the following steps:

S901. A terminal device receives an uplink grant from a base station.

S902. The terminal device sends a report to the base station in a reporting manner specific to a plurality of MAC entities, where the report includes a subreport corresponding to each MAC entity, and the subreport corresponding to each MAC entity is sorted in order.

The plurality of MAC entities may be understood as a plurality of cell groups CGs.

Figure 10:
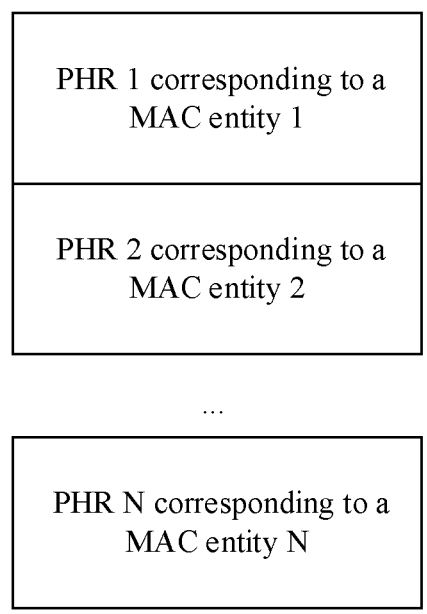
FIG. 10 is a schematic diagram of an example according to another embodiment of this disclosure.

Specifically, this disclosure provides a new PHR reporting format for the multi-connectivity communications system, so that subreports corresponding to the plurality of MAC entities may be stacked together in order and reported. Therefore, the new PHR reporting format is formed, which has better scalability. In contrast, reporting of a PHR in the multi-connectivity communications system is not supported in the prior art. FIG. 10 is a schematic diagram of an example according to another embodiment of this disclosure. As shown in FIG. 10, subreports of PHRs of N MAC entities may be sorted in order and stacked together for reporting.

Optionally, the subreports corresponding to the MAC entities may use a same reporting format or different reporting formats. This is not limited.

Figure 11:
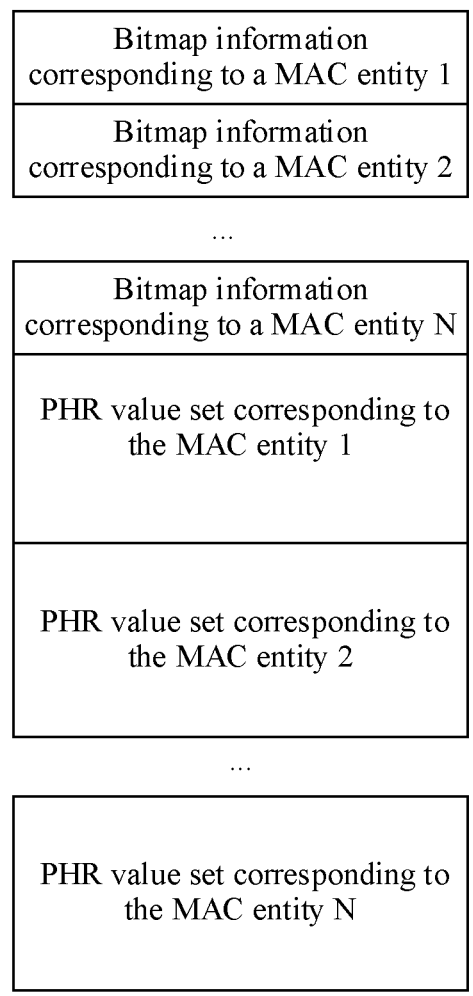
FIG. 11 is a schematic diagram of another example according to another embodiment of this disclosure.

Optionally, in an embodiment, the reporting format includes a plurality of pieces of bitmap information, the plurality of pieces of bitmap information are located before the subreports corresponding to the plurality of MAC entities, and each piece of bitmap information is used to indicate power headroom information corresponding to a serving cell of each MAC entity. In other words, the plurality of pieces of bitmap information of the MAC entities may further be located before a plurality of pieces of power headroom information. Optionally, each piece of bitmap information may be used to indicate a number of a cell or power headroom information corresponding to the cell. As shown in FIG. 11, N pieces of bitmap information are located before PH values corresponding to N MAC entities. Bitmap information (a bitmap for a MAC entity 1) corresponding to the MAC entity 1, bitmap information (a bitmap for a MAC entity 2) corresponding to the MAC entity 2, . . . , bitmap information (a bitmap for a MAC entity N) corresponding to the MAC entity N, a PH value set (a list of PHs for the MAC entity 1) corresponding to the MAC entity 1, a PH value set (a list of PHs for the MAC entity 2) corresponding to the MAC entity 2, . . . , and a PH value set (a list of PHs for the MAC entity N) corresponding to the MAC entity N are stacked together and reported.

Figure 12:
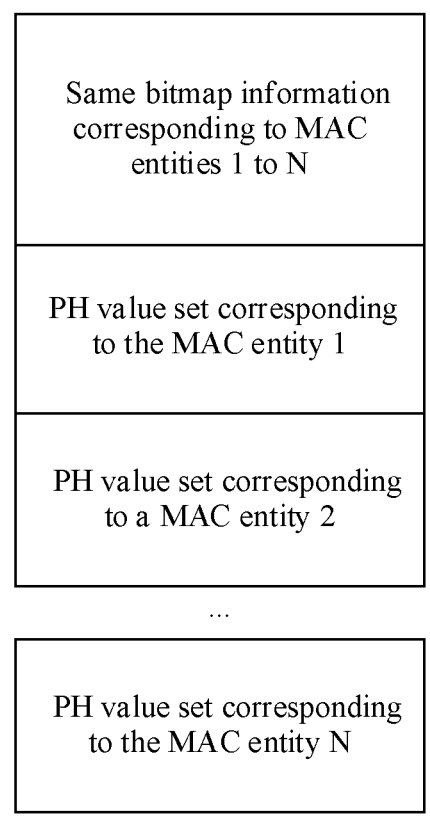
FIG. 12 is a schematic diagram of still another example according to another embodiment of this disclosure.

Alternatively, the report includes first bitmap information, the first bitmap information is located before the subreports corresponding to the plurality of MAC entities, and the first bitmap information is used to indicate power headroom information corresponding to the plurality of MAC entities. To be specific, one piece of bitmap information (e.g., the first bitmap information) may further be used to indicate the power headroom information of the plurality of MAC entities, and is located before the power headroom information of the plurality of MAC entities. Optionally, the first bitmap information may alternatively be used to indicate a number of a cell. As shown in FIG. 12, one piece of bitmap information is located before PH values corresponding to N MAC entities. The bitmap information (a bitmap for MAC entities 1 to N) corresponding to the MAC entities 1 to N, a PH value set (lists of PHs for the MAC entity 1) corresponding to the MAC entity 1, a PH value set (lists of PHs for a MAC entity 2) corresponding to the MAC entity 2, . . . , and a PH value set (lists of PHs for the MAC entity N) corresponding to the MAC entity N are stacked together and reported.

Optionally, an order of reporting the PH values of the MAC entities is not limited in FIG. 11 and PH bitmap. The PH values may be reported in ascending order or descending order of numbers of uplink subcarriers or BWPs, or reported in an order according to another rule.

Alternatively, if the terminal device and the base station are in a same MAC entity, the report includes second bitmap information, and the second bitmap information is used to indicate a PH set corresponding to a type ⅓.

Alternatively, if the terminal device and the base station are not in a same MAC entity, the report includes third bitmap information and fourth bitmap information, where the third bitmap information is used to indicate a PH set corresponding to a type ⅓ in a MAC entity in which the terminal device is located, and the fourth bitmap information is used to indicate a PH set corresponding to a type 2 in the MAC entity in which the terminal device is located.

Figure 13:
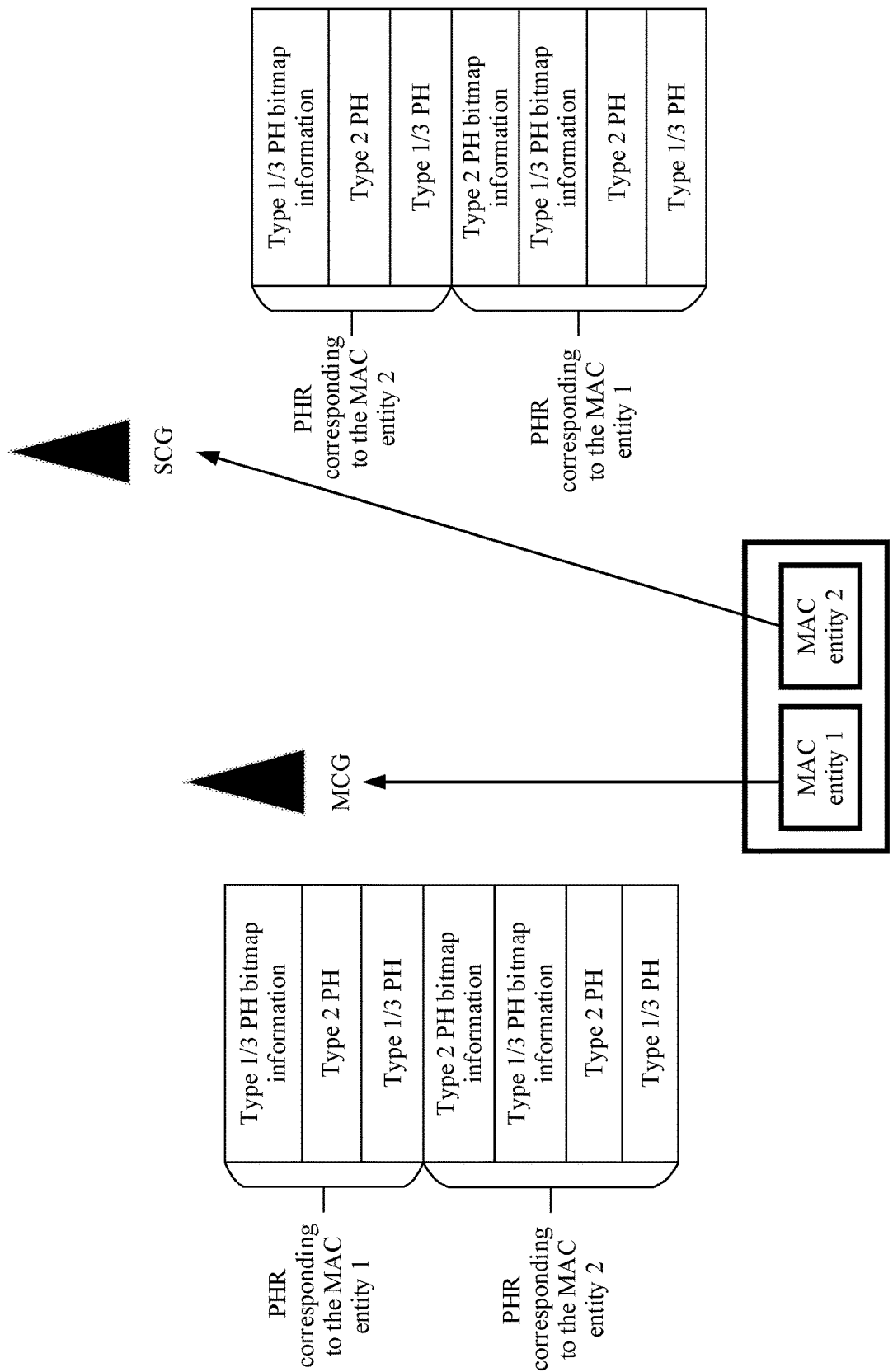
FIG. 13 is a schematic diagram of yet another example according to another embodiment of this disclosure.

Specifically, in a multi-connectivity scenario, if the terminal device and the base station are in a same MAC entity, one bitmap (e.g., the second bitmap information) may be used to indicate the PH set corresponding to the type ⅓. If the terminal device and the base station are not in a same MAC entity, two bitmaps should be used to indicate the PH set corresponding to the type ⅓ and the PH set corresponding to the type 2. For example, the third bitmap information is used to indicate the PH set corresponding to the type ⅓, and the fourth bitmap information is used to indicate the PH set corresponding to the type 2. For example, FIG. 13 is a schematic diagram of another example according to another embodiment of this disclosure. As shown in FIG. 13, a MAC entity 1 and a master cell group (MCG) are on a same side, and the MAC entity 1 and a second cell group (SCG) are on different sides. A MAC entity 2 and the SCG are on a same side, and the MAC entity 2 and the MCG are on different sides. When reporting a PHR to the MCG, the MAC entity 1 should use only one piece of bitmap information to indicate a PH set corresponding to the type ⅓ (that is, type ⅓ PH bitmap information). When reporting a PHR to the MCG, the MAC entity 2 should use one piece of bitmap information to indicate a PH set corresponding to the type ⅓ (that is, type ⅓ PH bitmap information) and another piece of bitmap information to indicate a PH set corresponding to the type 2 (that is, type 2 PH bitmap information). Likewise, when reporting a PHR to the SCG, the MAC entity 1 should use one piece of bitmap information to indicate a PH set corresponding to the type ⅓ (that is, type ⅓ PH bitmap information) and another piece of bitmap information to indicate a PH set corresponding to the type 2 (that is, type 2 PH bitmap information). When reporting a PHR to the SCG, the MAC entity 2 should use only one piece of bitmap information to indicate a PH set corresponding to the type ⅓ (that is, type ⅓ PH bitmap information).

Optionally, in an embodiment, the plurality of MAC entities include a MAC entity of an LTE version and a MAC entity of a version later than the LTE version. The MAC entity of the LTE version reports power headroom information to the base station based on a cell, while the MAC entity of the version later than the LTE version reports power headroom information to the base station based on an uplink subcarrier or a bandwidth part.

Specifically, in a multi-connectivity communication scenario, there may be a plurality of versions of MAC entities, for example, MAC entities of the LTE version and of the version (such as NR) later than the LTE version. In this case, a MAC entity of the LTE version may report power headroom information to the base station based on a cell, while a MAC entity of the version later than the LTE version may report power headroom information to the base station based on an uplink subcarrier or a bandwidth part.

Optionally, an uplink subcarrier is configured but no BWP is configured in a serving cell of one MAC entity, while a BWP is configured and activated in a cell of another MAC entity. In this case, the MAC entity configured with the uplink subcarrier still reports a PHR for each uplink subcarrier.

Optionally, in the multi-connectivity communications system, each MAC entity reports only a PH value of the MAC entity and a PH value of a MAC entity of a version earlier than a version of the MAC entity, and does not report a PH value of a MAC entity of a version later than the version of the MAC entity.

Therefore, the reporting format provided in the uplink data transmission method in this embodiment of this disclosure can support PHR reporting in the multi-connectivity communications system.

It should be understood that examples in FIG. 10 to FIG. 13 are provided merely for helping a person skilled in the art understand the embodiments of this disclosure, instead of limiting the embodiments of this disclosure to specific scenarios shown in the examples. Apparently, a person skilled in the art can make various equivalent modifications or changes based on the examples shown in FIG. 10 to FIG. 13, and such modifications or changes shall also fall within the scope of the embodiments of this disclosure.

The foregoing describes the uplink data transmission method in the embodiments of this disclosure, and the following describes a terminal device and a base station in embodiments of this disclosure.

Figure 14:
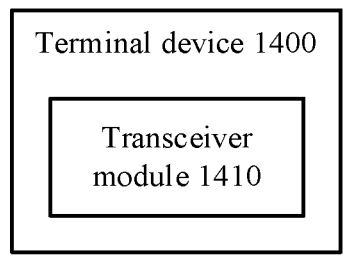
FIG. 14 is a schematic block diagram of a terminal device according to an embodiment of this disclosure.

FIG. 14 is a schematic block diagram of a terminal device 1400 according to an embodiment of this disclosure. The terminal device 1400 is configured to perform the foregoing methods or steps corresponding to the terminal device. Optionally, each module in the terminal device 1400 may be implemented by using software. As shown in FIG. 14, the terminal device 1400 includes a transceiver module 1410.

The transceiver module 1410 is configured to receive an uplink grant from a base station and is further configured to send a report to the base station, where the report includes a power headroom of each of at least one uplink subcarrier, and/or a power headroom of each of at least one bandwidth part.

Optionally, the report includes a report on a first media access control MAC entity, and the terminal device 1400 further includes a first processing module.

The first processing module is configured to: in a serving cell in which the first MAC entity is located, activate, configure, or reconfigure at least one of the following that correspond to the first MAC entity: an uplink subcarrier, a bandwidth part, and an uplink shared channel; and is further configured to trigger the report on the first MAC entity.

Optionally, a serving cell includes a plurality of MAC entities and is a serving cell in a process in which the terminal device performs multi-connectivity communication, and the terminal device 1400 further includes a first processing module.

The first processing module is configured to activate, configure, or reconfigure at least one of the following that correspond to a first MAC entity in the plurality of MAC entities: an uplink subcarrier, a bandwidth part, and an uplink shared channel; and is further configured to trigger a report on each of the plurality of MAC entities, or a report only on a first MAC entity.

Optionally, the transceiver module 1410 is specifically configured to:

send the report to the base station in a first reporting manner, where the report includes at least one of the following: identification information of a serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

Optionally, the transceiver module 1410 is specifically configured to:

send the report to the base station in a second reporting manner, where the report includes at least one of the following: identification information of a serving cell, power headroom information corresponding to each uplink subcarrier in the serving cell, power headroom information corresponding to each bandwidth part in the serving cell, or maximum transmit power information corresponding to the serving cell.

Optionally, the report further includes first indication information, and the first indication information is used to indicate whether to report power headroom information corresponding to an uplink subcarrier, or is used to indicate whether to report power headroom information corresponding to a bandwidth part.

Optionally, the terminal device 1400 further includes a configuration module or an obtaining module.

The configuration module is configured to: configure corresponding maximum transmit power for each uplink subcarrier, where maximum transmit power corresponding to all uplink subcarriers is the same or different; or configure corresponding maximum transmit power for each bandwidth part, where maximum transmit power corresponding to all bandwidth parts is the same or different.

The obtaining module is configured to: obtain, from a physical layer, at least one of a type corresponding to each uplink subcarrier, maximum transmit power corresponding to the type, and power headroom information corresponding to the type; or obtain, from a physical layer, at least one of a type corresponding to each bandwidth part, maximum transmit power corresponding to the type, and power headroom information corresponding to the type.

Optionally, the terminal device 1400 further includes a third processing module.

The third processing module is configured to perform uplink power control and is further configured to calculate the power headroom of each uplink subcarrier or the power headroom of each bandwidth part.

It should be understood that the terminal device 1400 in this embodiment of this disclosure may correspond to the method on a terminal device side in the uplink data transmission method 300 in the foregoing embodiment of the terminal device 1400. The foregoing and another management operation and/or function of each module in the terminal device 1400 are respectively intended to implement a corresponding step of the foregoing terminal devices 1400, and therefore beneficial effects of the foregoing method embodiments may also be implemented. For brevity, details are not described herein again.

It should be further understood that, in this embodiment of this disclosure, the processing module may be implemented by a processor and the transceiver module may be implemented by a transceiver.

Figure 15:
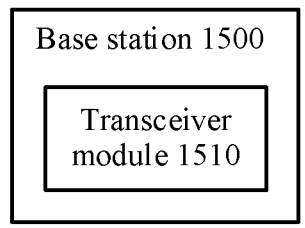
FIG. 15 is a schematic block diagram of a base station according to an embodiment of this disclosure.

FIG. 15 is a schematic block diagram of a base station 1500 according to an embodiment of this disclosure. The base station 1500 is configured to perform the foregoing methods or steps corresponding to the base station. Optionally, each module in the base station 1500 may be implemented by using software. As shown in FIG. 15, the base station 1500 includes a transceiver module 1510.

The transceiver module 1510 is configured to send an uplink grant to a terminal device.

The transceiver module 1510 is further configured to receive a report from the terminal device, where the report includes a power headroom of each of at least one uplink subcarrier, and/or a power headroom of each of at least one bandwidth part.

Optionally, the report includes at least one of the following: identification information of a serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

Optionally, the report includes at least one of the following: identification information of a serving cell, power headroom information corresponding to each uplink subcarrier in the serving cell, power headroom information corresponding to each bandwidth part in the serving cell, or maximum transmit power information corresponding to the serving cell.

Optionally, the report further includes first indication information, and the first indication information is used to indicate whether to report power headroom information corresponding to an uplink subcarrier, or is used to indicate whether to report power headroom information corresponding to a bandwidth part.

It should be understood that the base station 1500 in this embodiment of this disclosure may correspond to the method on a base station side in the uplink data transmission method 300 in the foregoing method embodiments. The foregoing and another management operation and/or function of each module in the base station 1500 are respectively intended to implement a corresponding step of the foregoing methods, and therefore beneficial effects of the foregoing method embodiments may also be implemented. For brevity, details are not described herein again.

Figure 16:
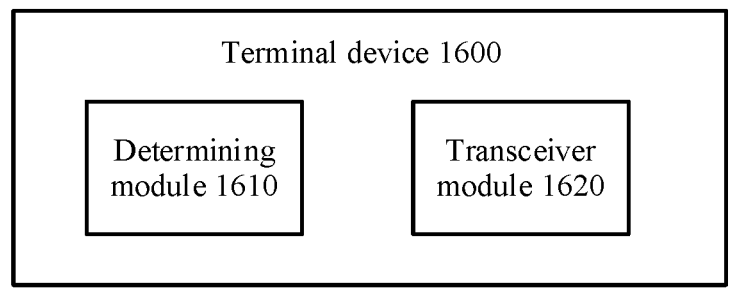
FIG. 16 is a structural block diagram of a terminal device according to an embodiment of this disclosure.

FIG. 16 is a schematic block diagram of a terminal device 1600 according to an embodiment of this disclosure. The terminal device 1600 is configured to perform the foregoing methods or steps corresponding to the terminal device. Optionally, each module in the terminal device 1600 may be implemented by using software. As shown in FIG. 16, the terminal device 1600 includes a determining module 1610 and a transceiver module 1620.

The determining module 1610 is configured to determine a reporting manner specific to a plurality of MAC entities.

The transceiver module 1620 is configured to send a report to a base station in the reporting manner specific to the plurality of MAC entities, where the report includes a subreport corresponding to each MAC entity, and the subreport corresponding to each MAC entity is sorted in order.

Optionally, the report includes a plurality of pieces of bitmap information, the plurality of pieces of bitmap information are located before subreports corresponding to the plurality of MAC entities, and each piece of bitmap information is used to indicate power headroom information corresponding to a serving cell of each MAC entity.

Alternatively, the report includes first bitmap information, the first bitmap information is located before subreports corresponding to the plurality of MAC entities, and the first bitmap information is used to indicate power headroom information corresponding to the plurality of MAC entities.

Alternatively, if the terminal device and the base station are in a same MAC entity, the report includes second bitmap information, and the second bitmap information is used to indicate a PH set corresponding to a type ⅓.

Alternatively, if the terminal device and the base station are not in a same MAC entity, the report includes third bitmap information and fourth bitmap information, where the third bitmap information is used to indicate a PH set corresponding to a type ⅓ in a MAC entity in which the terminal device is located, and the fourth bitmap information is used to indicate a PH set corresponding to a type 2 in the MAC entity in which the terminal device is located.

It should be understood that the terminal device 1600 in this embodiment of this disclosure may correspond to the method on a terminal device side in the uplink data transmission method 900 in the foregoing method embodiments. The foregoing and another management operation and/or function of each module in the terminal device 1600 are respectively intended to implement a corresponding step of the foregoing methods, and therefore beneficial effects of the foregoing method embodiments may also be implemented. For brevity, details are not described herein again.

Figure 17:
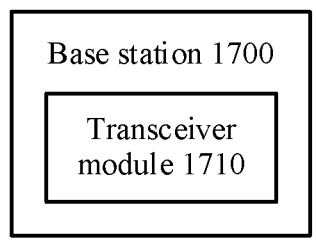
FIG. 17 is a schematic block diagram of a base station according to an embodiment of this disclosure.

FIG. 17 is a schematic block diagram of a base station 1700 according to an embodiment of this disclosure. The base station 1700 is configured to perform the foregoing methods or steps corresponding to the base station. Optionally, each module in the base station 1700 may be implemented by using software. As shown in FIG. 17, the base station 1700 includes a transceiver module 1710.

The transceiver module 1710 is configured to send an uplink grant to a terminal device and is further configured to receive a report from the terminal device, where the report includes a subreport corresponding to each MAC entity, and the subreport corresponding to each MAC entity is sorted in order.

Optionally, the report includes a plurality of pieces of bitmap information, the plurality of pieces of bitmap information are located before subreports corresponding to a plurality of MAC entities, and each piece of bitmap information is used to indicate power headroom information corresponding to a serving cell of each MAC entity.

Alternatively, the report includes first bitmap information, the first bitmap information is located before subreports corresponding to a plurality of MAC entities, and the first bitmap information is used to indicate power headroom information corresponding to the plurality of MAC entities.

Alternatively, if the terminal device and the base station are in a same MAC entity, the report includes second bitmap information, and the second bitmap information is used to indicate a PH set corresponding to a type ⅓.

Alternatively, if the terminal device and the base station are not in a same MAC entity, the report includes third bitmap information and fourth bitmap information, where the third bitmap information is used to indicate a PH set corresponding to a type ⅓ in a MAC entity in which the terminal device is located, and the fourth bitmap information is used to indicate a PH set corresponding to a type 2 in the MAC entity in which the terminal device is located.

Optionally, the plurality of MAC entities include a MAC entity of an LTE version and a MAC entity of a version later than the LTE version. The MAC entity of the LTE version reports power headroom information to the base station based on a cell, while the MAC entity of the version later than the LTE version reports power headroom information to the base station based on an uplink subcarrier or a bandwidth part.

It should be understood that the base station 1700 in this embodiment of this disclosure may correspond to the method on a base station side in the uplink data transmission method 900 in the foregoing method embodiments. The foregoing and another management operation and/or function of each module in the base station 1700 are respectively intended to implement a corresponding step of the foregoing methods, and therefore beneficial effects of the foregoing method embodiments may also be implemented. For brevity, details are not described herein again.

It should be further understood that, in this embodiment of this disclosure, a processing module may be implemented by a processor and the transceiver module may be implemented by a transceiver.

Figure 18:
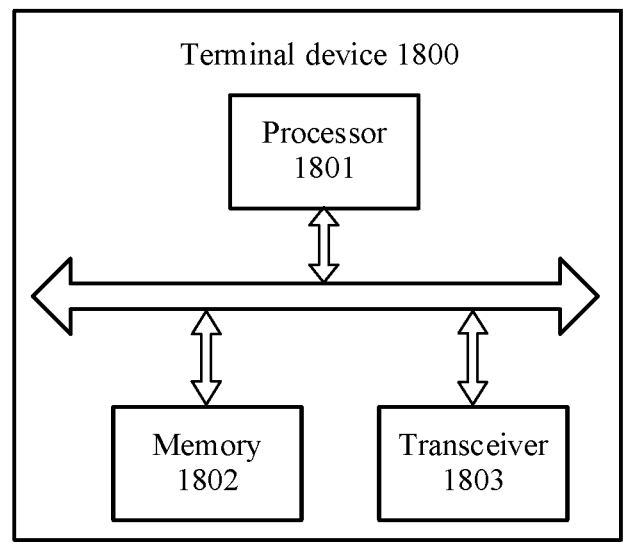
FIG. 18 is a schematic block diagram of a terminal device according to an embodiment of this disclosure.

FIG. 18 is a structural block diagram of a terminal device 1800 according to an embodiment of this disclosure. As shown in FIG. 18, the terminal device 1800 includes a processor 1801, a memory 1802, and a transceiver 1803.

The processor 1801, the memory 1802, and the transceiver 1803 communicate with each other by using an internal connection channel, to transfer a control signal and/or a data signal. In a possible design, the processor 1801, the memory 1802, and the transceiver 1803 may be implemented by using a chip. The memory 1802 may store program code, and the processor 1801 invokes the program code stored in the memory 1802, to implement a corresponding function of the terminal device.

The processor 1801 is configured to send a report to a base station by using the transceiver 1803, where the report includes a power headroom of each of at least one uplink subcarrier, and/or a power headroom of each of at least one bandwidth part. Alternatively, the processor 1801 is configured to send a report to a base station in a reporting manner specific to a plurality of MAC entities, where the report includes a subreport corresponding to each MAC entity, and the subreport corresponding to each MAC entity is sorted in order.

Figure 19:
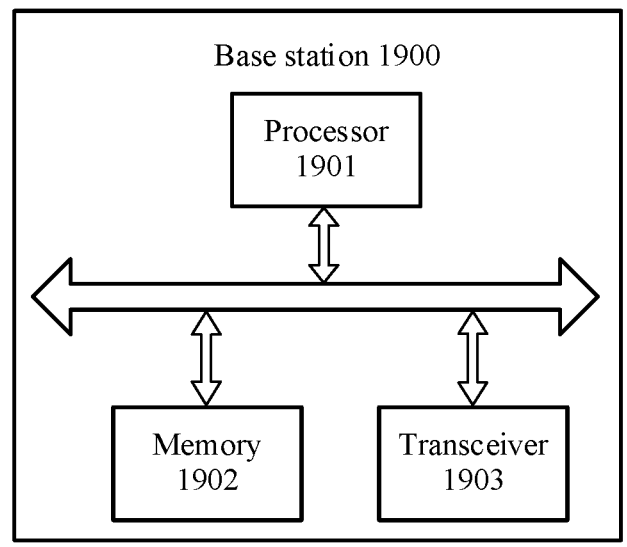
FIG. 19 is a structural block diagram of a base station according to an embodiment of this disclosure.

FIG. 19 is a structural block diagram of a base station 1900 according to an embodiment of this disclosure. As shown in FIG. 19, the base station 1900 includes a processor 1901, a memory 1902, and a transceiver 1903.

The processor 1901, the memory 1902, and the transceiver 1903 communicate with each other by using an internal connection channel, to transfer a control signal and/or a data signal. In a possible design, the processor 1901, the memory 1902, and the transceiver 1903 may be implemented by using a chip. The memory 1902 may store program code, and the processor 1901 invokes the program code stored in the memory 1902, to implement a corresponding function of the base station.

The processor 1901 is configured to receive, by using the transceiver 1903, a report sent by a terminal device, where the report includes a power headroom of each of at least one uplink subcarrier, and/or a power headroom of each of at least one bandwidth part. Alternatively, the processor 1901 is configured to receive a report that is sent to the base station by a terminal device in a reporting manner specific to a plurality of MAC entities, where the report includes a subreport corresponding to each MAC entity, and the subreport corresponding to each MAC entity is sorted in order.

The method disclosed in the embodiments of this disclosure may be applied to a processor or may be implemented by a processor. The processor may be an integrated circuit chip and has a signal processing capability. In an implementation process, steps in the foregoing methods may be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, a discrete hardware component, a system on a chip (SoC), a central processing unit (CPU), a network processor (NP), a digital signal processing circuit (DSP), a micro controller unit (MCU), a programmable controller (programmable logic device, PLD), or another integrated chip. The processor may implement or perform the methods, the steps, and logical block diagrams disclosed in the embodiments of this disclosure. The general purpose processor may be a microprocessor, or the processor may be any conventional processor or the like. Steps of the methods disclosed with reference to the embodiments of this disclosure may be directly executed and accomplished by means of a hardware decoding processor, or may be executed and accomplished by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, a register, or the like. The storage medium is located in a memory, and the processor reads instructions in the memory and completes the steps in the foregoing methods in combination with hardware of the processor.

It may be understood that when the embodiments of this disclosure are applied to a base station chip, the base station chip implements functions of the base station in the foregoing method embodiments. The base station chip receives a power headroom report from another module (e.g., a radio frequency module or an antenna) in the base station. The power headroom report is sent by a terminal device to the base station.

When the embodiments of this disclosure are applied to a terminal device chip, the terminal device chip implements functions of the terminal device in the foregoing method embodiments. The terminal device chip sends a power headroom report by using another module (e.g., a radio frequency module or an antenna) in the terminal device.

Unless otherwise specified, an expression used in this disclosure similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B and C. The foregoing uses three elements A, B, and C as an example to describe an optional case of the item. When the expression is "the item includes at least one of the following: A, B, . . . , and X", in other words, more elements are included in the expression, a case to which the item is applicable may also be obtained according to the foregoing rule.

It should be further understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

It should be further understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be further understood that numbers "first" and "second" introduced in the embodiments of this disclosure are merely intended to distinguish different objects, for example, distinguish different "MAC entities", or distinguish different "reporting manners", and constitute no limitation on the embodiments of this disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method of uplink data transmission that is applied to a multi-connectivity communications system, comprising:
    receiving, by a terminal device, an uplink grant from a base station; and
    sending, by the terminal device, a report to the base station, wherein the report comprises one or more of: a power headroom of at least one uplink subcarrier; and a power headroom of at least one bandwidth part that corresponds to the at least one uplink subcarrier, wherein the report further comprises a plurality of sub reports, each sub report corresponding to each of a plurality of media access control (MAC) entities located in a serving cell of a process in which the terminal device performs multi-connectivity communication, where the plurality of sub reports are sorted in a particular order.

2. The method of claim 1, wherein the method further comprises:
    in the serving cell, activating, configuring, or reconfiguring at least one of the following that correspond to a first MAC entity of the plurality of MAC entities in the serving cell: an uplink subcarrier, a bandwidth part, and an uplink shared channel; and
    triggering, by the terminal device, the sub report on the first MAC entity.

3. The method of claim 1, wherein the method further comprises:
    activating, configuring, or reconfiguring at least one of the following that correspond to a first MAC entity in the plurality of MAC entities: an uplink subcarrier, a bandwidth part, and an uplink shared channel; and
    triggering, by the terminal device, the sub report only on the first MAC entity.

4. The method of claim 1, wherein sending, by the terminal device, the report to the base station comprises:
    sending, by the terminal device, the report to the base station in a first reporting manner, wherein the report comprises at least one of the following: identification information of the serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

5. The method of claim 1, wherein sending, by the terminal device, the report to the base station comprises:
    sending, by the terminal device, the report to the base station in a second reporting manner, wherein the report comprises at least one of the following: identification information of the serving cell, power headroom information corresponding to each uplink subcarrier in the serving cell, power headroom information corresponding to each bandwidth part in the serving cell, or maximum transmit power information corresponding to the serving cell.

6. The method of claim 1, wherein the report further comprises first indication information, and the first indication information is used to indicate whether to report power headroom information corresponding to an uplink subcarrier, or is used to indicate whether to report power headroom information corresponding to a bandwidth part.

7. The method of claim 1, wherein the method further comprises:
    configuring, by the terminal device, corresponding maximum transmit power for each uplink subcarrier, wherein maximum transmit power corresponding to all uplink subcarriers is the same or different;
    configuring, by the terminal device, corresponding maximum transmit power for each bandwidth part, wherein maximum transmit power corresponding to all bandwidth parts is the same or different;
    obtaining, by the terminal device from a physical layer, at least one of a type corresponding to each uplink subcarrier, maximum transmit power corresponding to the type, and power headroom information corresponding to the type; or
    obtaining, by the terminal device from a physical layer, at least one of a type corresponding to each bandwidth part, maximum transmit power corresponding to the type, and power headroom information corresponding to the type.

8. The method of claim 1, wherein the method further comprises:
    performing, by the terminal device, uplink power control; and
    after the uplink power control, calculating, by the terminal device, the power headroom of each uplink subcarrier or the power headroom of each bandwidth part.

9. A method of uplink data transmission that is applied to a multi-connectivity communications system, comprising:
    sending, by a base station, an uplink grant to a terminal device; and
    receiving, by the base station, a report from the terminal device, wherein the report comprises one or more of: a power headroom of at least one uplink subcarrier; and a power headroom of at least one bandwidth part that corresponds to the at least one uplink subcarrier, wherein the report further comprises a plurality of sub reports, each sub report corresponding to each of a plurality of media access control (MAC) entities located in a serving cell of a process in which the terminal device performs multi-connectivity communication, where the plurality of sub reports are sorted in a particular order.

10. The method of claim 9, wherein the report comprises at least one of the following: identification information of the serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

11. An apparatus comprising: a processor and a memory storing instructions executable by the processor, wherein the instructions cause the processor to perform operations comprising:
  receiving, an uplink grant from a base station; and
  sending, a report to the base station, wherein the report comprises one or more of: a power headroom of at least one uplink subcarrier; and a power headroom of at least one bandwidth part that corresponds to the at least one uplink subcarrier, wherein the report further comprises a plurality of sub reports, each sub report corresponding to each of a plurality of media access control (MAC) entities located in a serving cell of a process in which the apparatus performs multi-connectivity communication, where the plurality of sub reports are sorted in a particular order.

12. The apparatus of claim 11, wherein the instructions cause the processor to perform further operations comprising:
  in the serving cell, activating, configuring, or reconfiguring at least one of the following that correspond to a first MAC entity of the plurality of MAC entities in the serving cell: an uplink subcarrier, a bandwidth part, and an uplink shared channel; and
  triggering, the sub report on the first MAC entity.

13. The apparatus of claim 11, wherein the instructions cause the processor to perform further operations comprising:
  activating, configuring, or reconfiguring at least one of the following that correspond to a first MAC entity in the plurality of MAC entities: an uplink subcarrier, a bandwidth part, and an uplink shared channel; and
  triggering, the sub report only on the first MAC entity.

14. The apparatus of claim 11, wherein sending, the report to the base station comprises:
  sending, the report to the base station in a first reporting manner, wherein the report comprises at least one of the following: identification information of the serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

15. The apparatus of claim 11, wherein sending, the report to the base station comprises:
  sending, the report to the base station in a second reporting manner, wherein the report comprises at least one of the following: identification information of the serving cell, power headroom information corresponding to each uplink subcarrier in the serving cell, power headroom information corresponding to each bandwidth part in the serving cell, or maximum transmit power information corresponding to the serving cell.

16. The apparatus of claim 11, wherein the report further comprises first indication information, and the first indication information is used to indicate whether to report power headroom information corresponding to an uplink subcarrier, or is used to indicate whether to report power headroom information corresponding to a bandwidth part.

17. The apparatus of claim 11, wherein the instructions cause the processor to perform further operations comprising:
  configuring, corresponding maximum transmit power for each uplink subcarrier, wherein maximum transmit power corresponding to all uplink subcarriers is the same or different;
  configuring, corresponding maximum transmit power for each bandwidth part, wherein maximum transmit power corresponding to all bandwidth parts is the same or different;
  obtaining, from a physical layer, at least one of a type corresponding to each uplink subcarrier, maximum transmit power corresponding to the type, and power headroom information corresponding to the type; or
  obtaining, from a physical layer, at least one of a type corresponding to each bandwidth part, maximum transmit power corresponding to the type, and power headroom information corresponding to the type.

18. The apparatus of claim 11, wherein the instructions cause the processor to perform further operations comprising:
  performing, uplink power control; and
  after the uplink power control, calculating, the power headroom of each uplink subcarrier or the power headroom of each bandwidth part.

19. An apparatus comprising: a processor and a memory storing instructions executable by the processor, wherein the instructions cause the processor to perform operations comprising:
  sending, an uplink grant to a terminal device; and
  receiving, a report from the terminal device, wherein the report comprises one or more of a power headroom of at least one uplink subcarrier; and a power headroom of at least one bandwidth part that corresponds to the at least one uplink subcarrier, wherein the report further comprises a plurality of sub reports, each sub report corresponding to each of a plurality of media access control (MAC) entities located in a serving cell of a process in which the terminal device performs multi-connectivity communication, where the plurality of sub reports are sorted in a particular order.

20. The apparatus of claim 19, wherein the report comprises at least one of the following: identification information of the serving cell, power headroom information corresponding to each uplink subcarrier in the serving cell, power headroom information corresponding to each bandwidth part in the serving cell, maximum transmit power information corresponding to each uplink subcarrier in the serving cell, or maximum transmit power information corresponding to each bandwidth part in the serving cell.

* * * * *